United States Patent
Murakami et al.

(10) Patent No.: US 11,804,617 B2
(45) Date of Patent: Oct. 31, 2023

(54) SEPARATOR FOR POWER STORAGE DEVICE AND METHOD FOR PRODUCING SAME, AND POWER STORAGE DEVICE AND METHOD FOR PRODUCING SAME

(71) Applicant: Asahi Kasei Kabushiki Kaisha, Tokyo (JP)

(72) Inventors: Masato Murakami, Tokyo (JP); Shintaro Inaba, Tokyo (JP); Shinya Hisamitsu, Tokyo (JP); Daisuke Inagaki, Tokyo (JP); Hiroshi Hatayama, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 896 days.

(21) Appl. No.: 16/489,075

(22) PCT Filed: Nov. 9, 2018

(86) PCT No.: PCT/JP2018/041742
§ 371 (c)(1),
(2) Date: Aug. 27, 2019

(87) PCT Pub. No.: WO2019/107119
PCT Pub. Date: Jun. 6, 2019

(65) Prior Publication Data
US 2020/0067055 A1 Feb. 27, 2020

(30) Foreign Application Priority Data

Nov. 28, 2017 (JP) ................. 2017-228269

(51) Int. Cl.
*H01M 10/0525* (2010.01)
*H01M 50/403* (2021.01)
*H01M 50/491* (2021.01)
*H01M 50/417* (2021.01)
*H01M 50/489* (2021.01)
*H01M 50/431* (2021.01)
*H01M 4/02* (2006.01)

(52) U.S. Cl.
CPC ..... *H01M 10/0525* (2013.01); *H01M 50/403* (2021.01); *H01M 50/417* (2021.01); *H01M 50/489* (2021.01); *H01M 50/491* (2021.01); *H01M 50/431* (2021.01); *H01M 2004/027* (2013.01); *H01M 2004/028* (2013.01)

(58) Field of Classification Search
CPC .............................. H01M 4/62; H01M 4/623
See application file for complete search history.

(56) References Cited

U.S. PATENT DOCUMENTS

| | | | |
|---|---|---|---|
| 2004/0122192 A1 | 6/2004 | Imuta et al. | |
| 2011/0052962 A1 | 3/2011 | Suzuki et al. | |
| 2011/0305940 A1* | 12/2011 | Usami | C08J 9/0061 429/144 |
| 2013/0149613 A1 | 6/2013 | Yoshikawa et al. | |
| 2015/0050545 A1* | 2/2015 | Murata | H01M 50/417 429/145 |
| 2015/0280197 A1* | 10/2015 | Zhao | H01M 50/449 429/144 |
| 2018/0331339 A1 | 11/2018 | Ogata | |

FOREIGN PATENT DOCUMENTS

| | | |
|---|---|---|
| JP | 2008-071979 A | 3/2005 |
| JP | 2007-095440 A | 4/2007 |
| JP | 2008-041604 A | 2/2008 |
| JP | 2009-197096 A | 9/2009 |
| JP | 2010-262785 A | 11/2010 |
| JP | 2012-144663 A | 8/2012 |
| JP | 2013-070006 A | 4/2013 |
| JP | 2016-031833 A | 3/2016 |
| KR | 10-2007-0101185 A | 10/2007 |
| KR | 10-2015-0009856 A | 1/2015 |
| WO | 2012/005139 A1 | 1/2012 |

OTHER PUBLICATIONS

International Search Report issued in corresponding International Patent Application No. PCT/JP2018/041742 dated Dec. 18, 2018.
Supplementary European Search Report issued in corresponding European Patent Application No. 18882570.7 dated Dec. 15, 2020.

* cited by examiner

*Primary Examiner* — Carlos Barcena
(74) *Attorney, Agent, or Firm* — Morgan, Lewis & Bockius LLP

(57) ABSTRACT

This separator for a power storage device has a porous layer containing a polyolefin resin and surface-treated ionic compound. The ionic compound content of the porous layer is 5 to 99 mass %, and the degree of surface hydrophilicity of the ionic compound is 0.10 to 0.80.

17 Claims, 3 Drawing Sheets

SEPARATOR FOR POWER STORAGE DEVICE AND METHOD FOR PRODUCING SAME, AND POWER STORAGE DEVICE AND METHOD FOR PRODUCING SAME

FIELD

The present invention relates to a separator for electricity storage devices, a method for manufacturing the same, an electricity storage device comprising the separator for electricity storage devices, and a method for manufacturing the same.

BACKGROUND

Electricity storage devices have been used in a wide range of applications such as a power source for consumer appliances, automotive onboard power source, stationary power source, etc. Among these electricity storage devices, a lithium ion secondary battery has excellent features such as high energy density and high durability, and thus its use as a power source for electric vehicles has been rapidly expanding in recent years.

In the lithium ion secondary battery, a polyolefin microporous membrane is generally used as a separator. The separator is disposed between a positive electrode and a negative electrode to prevent electron conduction due to direct contact or short circuit between the positive and negative electrodes, while allowing ion conduction through an electrolytic solution held in microporous pores of the separator.

An electricity storage device for electric vehicles needs to have advanced input/output characteristics since charge and discharge with a large current in a short time such as quick charge and a regenerative brake are frequently carried out. Accordingly, high ion conductivity is required for the separator. Moreover, a high level of safety for the electricity storage device is also required, and it is desirable for the separator not to contain metal impurities. When metal impurities are mixed in the electricity storage device and cannot be found in the initial inspection, internal short circuit may occur during use of the electricity storage device, and serious problems such as abnormal heating and ignition, etc., may occur. Furthermore, the heat resistance of the separator is also important from the viewpoint of enhancing safety of the electricity storage device. It is preferable for the separator to maintain insulation between the positive and negative electrodes also at a temperature equal to or higher than the melting point of a polyolefin resin.

In recent years, various attempts have been considered for improvement on ion conductivity of separators. For example, Patent Document 1 discloses a method for fabricating a metal oxide-containing polyolefin microporous membrane by combined use of a polyethylene resin and metal oxide. Specifically, metal oxide such as alumina, magnesia, titanic, etc., and high density polyethylene are melt-kneaded, and the kneaded product is stretched to strip off at the interface between the filler and the resin, fabricating a porous membrane.

Moreover, Patent Document 2 also discloses a method for manufacturing a metal oxide-containing polyolefin microporous membrane according to the method (so-called "wet method") for rendering the membrane porous by extraction of a plasticizer also by combined use of the plasticizer while melt-kneading the polyethylene resin and metal oxide. Specifically, the microporous membrane is manufactured by melt-kneading metal oxide such as alumina, silica, etc., high density polyethylene, and a plasticizer, stretching the kneaded product, and then extracting the plasticizer.

Next, Patent Document 3 discloses a method for fabricating a zinc oxide-containing polyethylene microporous membrane by using a polyethylene resin and zinc oxide in combination. Specifically, the microporous membrane in which zinc oxide polyethylene are formed into a composite body, is manufactured by combined use of high density polyethylene and zinc oxide (average particle size of 40 to 100 nm).

Further, Patent Document 4 discloses a method for fabricating a barium sulfate-containing polyolefin microporous membrane by mixing a polyolefin resin and barium sulfate. Specifically, polyolefin resins such as high density polyethylene, soft polypropylene, etc., and barium sulfate (average particle size of 660 nm) as a filler are mixed, and the obtained mixture is stretched followed by stripped off at the interface between the resin and the filler to form a porous membrane.

On the other hand, various investigations have been considered also from the viewpoint of enhancing heat resistance of the separator. The most widely used method is a method for forming a heat-resistant layer mainly containing an inorganic filler and/or a heat-resistant organic resin on a base film using a polyolefin microporous membrane. For example, in Patent Document 5, the heat-resistant layer containing silica as a main component is formed on a polyethylene microporous membrane, improving the heat resistance of the separator.

PATENT DOCUMENTS

[Patent Document 1] Japanese Unexamined Patent Publication (Kokai) No. 2008-41604
[Patent Document 2] Japanese Unexamined Patent Publication (Kokai) No. 2010-262785
[Patent Document 3] Japanese Unexamined Patent Publication (Kokai) No. 2012-144663
[Patent Document 4] Japanese Unexamined Patent Publication (Kokai) No. 2005-71979
[Patent Document 5] WO2012/005139

DISCLOSURE OF THE INVENTION

Problems to be Solved by the Invention

However, according to the technology described in Patent Documents 1 and 2 whereby the polyolefin microporous membrane contains the metal oxide filler, when the polyolefin microporous membrane is used as a separator of electricity storage devices, the metal oxide induces the side reaction inside the electricity storage device, which may cause reduction in durability of the electricity storage device.

According to the technology described in Patent Documents 3 and 4 whereby the hydrophilic filler such as zinc oxide, barium sulfate, etc., is used, there is a likelihood of aggregation of the filler in the polyolefin resin, and macrovoids mainly derived from the aggregates are generated in the stretching step. As a result, the pore size of the microporous membrane may be partially coarse, which may affect the safety of the electricity storage device.

According to the technology described in Patent Document 5 whereby the polyethylene microporous membrane is used as a base material of the heat-resistant layer, polyethylene melts and flows at elevated temperatures, and the insulation of the separator may not be maintained. Moreover, this technology requires a process for producing the base material and process for forming the heat-resistant layer, also giving rise to problems of multiple processes and low productivity.

The present invention has been devised in light of the above situations, and thus the problem to be solved by the present invention is to provide a separator for electricity storage devices having high ion conductivity and heat resistance as well as a low amount of metal impurities, a method for manufacturing the separator, an electricity storage device comprising the separator for electricity storage devices manufactured by the method, and a method for manufacturing the same.

Means for Solving the Problem

The present inventors have conducted much diligent experimentation with the aim of solving the problems described above. As a result, the present inventors have found that the problem can be solved by the following constitutions or steps and thus have completed the present invention.

Namely, the present invention is as described below.

[1] A separator for electricity storage devices, which has a porous layer comprising a polyolefin resin and a surface-treated ionic compound having a content of 5% by weight or more and 99% by weight or less in the porous layer, wherein the degree of surface hydrophilicity of the ionic compound is 0.10 or more and 0.80 or less.

[2] A separator for electricity storage devices, which has a porous layer comprising a polyolefin resin and a surface-treated ionic compound having a content of 5% by weight or more and 99% by weight or less in the porous layer, wherein a ratio of a weight loss of the ionic compound at 350° C. to that at 550° C. is 0.03 or more and 0.70 or less.

[3] The separator for electricity storage devices according to [1] or [2], wherein the ionic compound has a content of 5% by weight or more and less than 50% by weight in the porous layer.

[4] The separator for electricity storage devices according to [1] or [2], wherein the ionic compound has a content of 86% by weight or more and 99% by weight or less in the porous layer.

[5] The separator for electricity storage devices according to any one of [1] to [4], wherein the ionic compound is surface-treated with one or more selected from the group consisting of saturated fatty acid, unsaturated fatty acid, a saturated fatty acid salt, and an unsaturated fatty acid salt.

[6] The separator for electricity storage devices according to any one of [1] to [5], wherein a surface treatment amount of the ionic compound is 0.1% by weight or more and 10% by weight or less based on 100% by weight of the surface-treated ionic compound.

[7] The separator for electricity storage devices according to any one of [1] to [6], wherein the ionic compound has one or more anions selected from the group consisting of a sulfate ion, a nitrate ion, a phosphate ion, and a halide ion.

[8] The separator for electricity storage devices according to any one of [1] to [7], wherein the ionic compound has one or more cations selected from the group consisting of an alkali metal ion and an alkaline earth metal ion.

[9] The separator for electricity storage devices according to any one of [1] to [8], wherein the ionic compound is barium sulfate.

[10] The separator for electricity storage devices according to any one of [1] to [9], wherein an average particle size of the ionic compound is 5 nm or more and 600 nm or less.

[11] The separator for electricity storage devices according to any one of [1] to [10], wherein the polyolefin resin contains polyethylene having a viscosity-average molecular weight of 600,000 or more.

[12] The separator for electricity storage devices according to any one of [1] to [11], wherein an average pore size is 10 nm or more and 150 nm or less.

[13] The separator for electricity storage devices according to any one of [1] to [12], wherein an air permeability is 10 seconds/100 ml or longer and 500 seconds/100 ml or shorter.

[14] The separator for electricity storage devices according to any one of [1] to [13], wherein a puncture strength is 100 gf or more and 600 gf or less.

[15] A method for manufacturing a separator for electricity storage devices, wherein a plasticizer is extracted from a kneaded product containing a plasticizer having an infrared (IR) absorbance ratio $A_{1700\ to\ 1800}/A_{2700}$ of 0.01 or more and 0.25 or less, a polyolefin resin, and an ionic compound.

[16] The method for manufacturing a separator for electricity storage devices according to [15], wherein a sheet molding of the kneaded product is stretched 4 times or more and 15 times or less in a machine direction (MD) and 4 times or more and 15 times or less in a transverse direction (TD).

[17] The method for manufacturing a separator for electricity storage devices according to [15] or [16], which comprises a step of simultaneously stretching the sheet molding of the kneaded product to MD and TD.

[18] An electricity storage device comprising a positive electrode, a negative electrode, the separator for electricity storage devices according to any one of [1] to [14] or the separator for electricity storage devices manufactured according to any one of [15] to [17].

[19] A method for manufacturing an electricity storage device, which comprises the following steps:
(1) a step of combining a positive electrode and a negative electrode via the separator for electricity storage devices according to any one of [1] to [14] or the separator for electricity storage devices manufactured according to any one of [15] to [17], and inserting to an outer package; and
(2) a step of injecting a nonaqueous electrolytic solution into the outer package and sealing the outer package.

Effects of the Invention

The present invention enables to provide a separator for electricity storage devices having high ion conductivity and heat resistance as well as a low amount of metal impurities, a method for manufacturing the separator, an electricity storage device comprising the separator for electricity storage devices, and a method for manufacturing the same.

MODE FOR CARRYING OUT THE INVENTION

Figure 1:
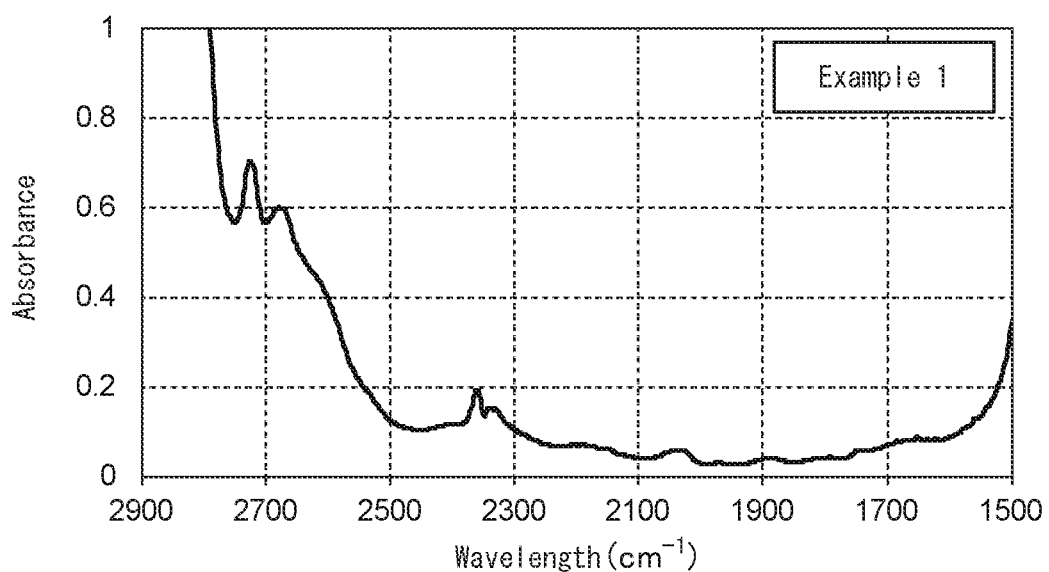
FIG. 1 is a graph illustrating an infrared (IR) spectrum of the plasticizer used in Example 1.

Embodiments for carrying out the invention (hereunder referred to as "the present embodiment") will now be explained in detail below. It is to be understood, however, that the present invention is not limited to the following embodiments and may be implemented with appropriate modifications within the scope of its gist.

<<Porous Layer>>

The separator for electricity storage devices according to the present embodiment has a porous layer comprising a polyolefin resin and a surface-treated ionic compound. The porous layer contributes to improve not only ion permeability and heat resistance of the separator for electricity storage devices but also input/output characteristics of an electricity storage device and safety, by combined use of the polyolefin resin and the ionic compound that is subjected to the specific surface treatment.

The thickness of the porous layer is preferably 1 μm or more, more preferably 2 μm or more, and still more preferably 3 μm or more. When the thickness of the porous layer is 1 μm or more, the heat resistance of the separator for electricity storage devices is improved. Also, the thickness of the porous layer is preferably 20 μm or less, more preferably 18 μm or less, and still more preferably 16 μm or less. When the thickness of the porous layer is 20 μm or less, the energy density of an electricity storage device can be increased.

The porosity of the porous layer is preferably 30% or more, more preferably 35% or more, and still more preferably 40% or more from the viewpoint of enhancing the ion permeability of the separator for electricity storage devices. On the other hand, from the viewpoint of maintaining the structural stability of the separator for electricity storage devices, it is preferably 70% or less, more preferably 65% or less, and still more preferably 60% or less.

The thickness proportion of the porous layer relative to the whole separator for electricity storage devices is preferably greater than 0% and 100% or less, more preferably 10% or more and 100% or less, and still more preferably 20% or more and 100% or less in consideration of the heat resistance, ion permeability and physical strength of the separator for electricity storage devices. The thickness proportion of the porous layer being 100% is preferred to facilitate manufacturing. On the other hand, even if the thickness proportion of the porous layer is less than 100%, since the high heat resistance of the porous layer can be imparted to the whole separator, it may be less than 100%.

The method for fabricating the porous layer is not particularly limited, and various methods can be employed.

Specifically, stretching steps such as uniaxial stretching, biaxial stretching, etc.; removal steps of a third component other than the polyolefin resin and ionic compound by means such as extraction, volatilization, decomposition, etc., may be applied. As the third component, plasticizers such as liquid paraffin, dioctyl phthalate, etc.; solvents such as acetone, water, etc.; and inorganic substances such as calcium carbonate, silica, etc., can be used alone or in combination thereof. As a method for fabricating the porous layer, from the viewpoint of reducing a manufacturing cost of the separator, it is preferable to have at least the stretching step, more preferable to have the stretching step and the third component removal step, still more preferable to have the stretching step and the third component extraction step, and particularly preferable to have the biaxial stretching step and the plasticizer extraction step. When the porous layer is fabricated by these methods, not only the porous layer can be uniformly formed but also physical property adjustment such as thickness, porosity, etc., of the separator is facilitated.

<<Polyolefin Resin>>

The separator for electricity storage devices according to the present embodiment has a porous layer comprising a polyolefin resin. The polyolefin resin used in the present embodiment is a polyolefin resin used for general extrusion, injection, inflation, blow molding, etc., and is a polymer containing olefin hydrocarbon as a monomer component, such as a homopolymer, copolymer and multistage polymer of ethylene, propylene, 1-butene, 2-butene, 4-methyl-1-pentene, 1-hexene, 1-octene, etc. Also, at least one of the polyolefins selected from the group consisting of the homopolymer, copolymer, and multistage polymer, can be used singly or in admixture.

As the polyolefin resin, examples thereof include low density polyethylene (density 0.910 g/cm$^3$ or more and less than 0.930 g/cm$^3$), linear low density polyethylene (density 0.910 g/cm$^3$ or more and 0.940 g/cm$^3$ or less), middle density polyethylene (density 0.930 g/cm$^3$ or more and less than 0.942 g/cm$^3$), high density polyethylene (density 0.942 g/cm$^3$ or more), ultra-high molecular weight polyethylene (density 0.910 g/cm$^3$ or more and 0.970 g/cm$^3$ or less), isotactic polypropylene, syndiotactic polypropylene, atactic polypropylene, polybutene, polymethylpentene and ethylene propylene rubber.

The proportion of the polyolefin resin in the porous layer is preferably greater than 0% by weight, more preferably 1% by weight or more, and still more preferably 2% by weight or more. The proportion of the polyolefin resin in the porous layer may be 5% by weight or more, 10% by weight or more, 20% by weight or more, 50% by weight or more, 60% by weight or more, or 70% by weight or more. When the proportion of the polyolefin resin exceeds 0% by weight, formation of the porous layer is facilitated, and physical strength can also be imparted to the porous layer. Also, this proportion is preferably 95% by weight or less, more preferably 90% by weight or less, and still more preferably 85% by weight or less. When the proportion of the polyolefin resin is 95% by weight or less, the heat resistance of the separator for electricity storage devices tends to be high.

The proportion of the polyolefin resin in the entire separator for electricity storage devices is preferably 5% by weight or more, more preferably 10% by weight or more, and still more preferably 15% by weight or more. When the proportion of the polyolefin resin is 5% by weight or more, sufficient physical strength can be imparted to the separator for electricity storage devices. Moreover, this proportion is preferably 95% by weight or less, more preferably 90% by weight or less, and still more preferably 85% by weight or less. When the proportion of the polyolefin resin is 95% by weight or less, the heat resistance of the separator for electricity storage devices tends to be high.

The polyolefin resin preferably contains high density polyethylene. The proportion of the high density polyethylene in the polyolefin resin is preferably 10% by weight or more, more preferably 20% by weight or more, and further preferably 30% by weight or more, and it may be 100% by weight. When the proportion of the high density polyethylene in the polyolefin resin is 10% by weight or more, the strength of the separator is increased due to the entanglement of the high density polyethylene molecular chains.

From the viewpoint of improving the heat resistance of the separator, the polyolefin resin preferably contains polypropylene. The proportion of polypropylene in the polyolefin resin is preferably 1% by weight or more, more preferably 5% by weight or more, and still more preferably 15% by weight or more. Also, the proportion of polypropylene in the polyolefin resin is preferably 30% by weight or less, more preferably 20% by weight or less, and still more preferably 10% by weight or less. It is preferable to adjust the proportion of polypropylene to 1% by weight or more from the viewpoint of improving the heat resistance of the separator. On the other hand, from the viewpoint of enhancing the uniformity of the separator, the proportion of polypropylene is preferably 30% by weight or less.

The polyolefin resin preferably contains high molecular weight polyethylene. The proportion of the high molecular weight polyethylene in the polyolefin resin is preferably 30% by weight or more, more preferably 50% by weight or more, and still more preferably 65% by weight or more, and it may be 100% by weight. The viscosity-average molecular weight (Mv) of the high molecular weight polyethylene is preferably 600,000 or higher and 5,000,000 or lower, more preferably 650,000 or higher and 4,000,000 or lower, and still more preferably 700,000 or higher and 3,000,000 or lower. The viscosity-average molecular weight can be determined by measuring the intrinsic viscosity at 135° C. in a decalin solvent based on ASTM-D4020 and calculating from the equation below corresponding to the polyolefin resin. For polyethylene, Mv can be calculated by the following equation.

$$[\eta]=6.77 \times 10^{-4} \, Mv^{0.67}$$

For polypropylene, $Mv$ can be calculated by the following equation.

$$[\eta]=1.10 \times 10^{-4} \, Mv^{0.80}$$

It is preferable to use the polyolefin having a viscosity-average molecular weight of 600,000 or more from the viewpoint of maintaining a high melt tension to ensure favorable moldability when melt-kneading a polyolefin resin composition, and from the viewpoint of imparting sufficient entanglements to the polyolefin resin molecules to increase strength of the separator. On the other hand, adjusting the viscosity-average molecular weight to 5,000,000 or less is preferable from the viewpoint of improving stability for extrusion molding of the polyolefin resin.

In the polyolefin resin used in the present embodiment, if necessary, antioxidants such as phenol-based, phosphorus-based, sulfur-based antioxidants, etc., metal soaps such as calcium stearate, lithium stearate, etc., additives such as ultraviolet light absorbers, light stabilizers, antistatic agents, antifogging agents, color pigments, etc., can be mixed and used, provided that the advantages of the present invention are not impaired.

<<Ionic Compound>>

The separator for electricity storage devices according to the present embodiment contains an ionic compound. The ionic compound used in the present embodiment refers to a compound that is composed of a combination of one or more cations and one or more anions and is electrically neutral based on strong chemical bonding such as ionic bonding.

The ionic compound is not particularly restricted provided it is composed of a combination of a cation and an anion, however, examples thereof include sulfates such as lithium sulfate, sodium sulfate, magnesium sulfate, calcium sulfate, barium sulfate, etc.; nitrates such as lithium nitrate, sodium nitrate, magnesium nitrate, potassium nitrate, etc.; phosphates such as lithium phosphate, sodium phosphate, magnesium phosphate, potassium phosphate, etc.; halides such as lithium fluoride, sodium chloride, sodium bromide, etc.; carbonates such as lithium carbonate, sodium carbonate, sodium hydrogen carbonate, etc.; hexafluorophosphates such as lithium hexafluorophosphate, etc.; tetrafluoroborates such as lithium tetrafluoroborate, etc.; perchlorates such as lithium perchlorate, etc.

The anion of the ionic compound is preferably one or more species selected from the group consisting of a sulfate ion, nitrate ion, phosphate ion, and halide ion in consideration of both the stability inside the electricity storage device and the cost. It is more preferably one or more selected from the group consisting of a sulfate ion, phosphate ion, and halide ion, furthermore preferably a sulfate ion and/or phosphate ion, and particularly preferably a sulfate ion.

Moreover, when considering both the stability inside the electricity storage device and the cost, the cation of the ionic compound is preferably an alkali metal ion and/or alkaline earth metal ion, more preferably one or more ion species selected from the group consisting of a lithium ion, sodium ion, potassium ion, magnesium ion, calcium ion, strontium ion, and barium ion, still more preferably one or more ion species selected from the group consisting of a magnesium ion, calcium ion, and barium ion, and particularly preferably a barium ion. Namely, as the ionic compound, barium sulfate is most preferred in consideration of the stability inside the electricity storage device. Moreover, the ionic compound may be used singly, and two or more thereof may be used in combination.

The shape of the ionic compound may be, for example, plate-like, scaly, acicula, columnar, spherical, polyhedral, massive, etc., and a plurality of ionic compounds having the above shapes may be used in combination. The shape of the ionic compound is not particularly limited, however from the viewpoint of dispersibility to the polyolefin resin, columnar, spherical or polyhedral ions are preferred, and spherical ions are more preferred.

Carbonates such as calcium carbonate, etc., have long been widely used as fillers for various polymers, and their performance as fillers has been demonstrated in various applications. However, carbonate used in a special environment such as the inside of electricity storage devices is not preferred because the carbonate may be decomposed to generate carbon dioxide. Other than carbonates, ionic compounds such as sulfates, phosphates, and halides are preferable since these are highly stable inside the electricity storage device.

Metal oxides such as alumina, etc., are known to be more covalent than ionic as the nature of the chemical bonds of the metal oxide. Therefore, in the present invention, alumina, boehmite, silica, titania, yttria, zirconia, lithium oxide, sodium oxide, potassium oxide, magnesium oxide, calcium oxide, vanadium oxide, chromium oxide, manganese oxide, iron oxide, cobalt oxide, nickel oxide, copper oxide, zinc oxide and cerium oxide are classified as metal oxides and not included in ionic compounds. Also, compounds composed of a plurality of metal oxides such as potassium titanate ($K_2O \cdot 8TiO_2$), etc., are also classified as metal oxides.

The proportion of the ionic compound in the porous layer (i.e., the content of the ionic compound in the porous layer)

is 5% by weight or more, preferably 10% by weight or more, and more preferably 15% by weight or more, and still more preferably 20% by weight or more. When the proportion of the ionic compound is 5% by weight or more, the heat resistance of the separator tends to be improved, however from the viewpoint of securing sufficient heat resistance in actual use, it is desirably 86% by weight or more, more desirably 87% by weight or more, still more desirably 88% by weight or more, and particularly desirably 89% by weight or more. On the other hand, from the viewpoint of enhancing the ion permeability of the separator while maintaining the physical strength thereof, it is 5% by weight or more, preferably 10% by weight or more, more preferably 15% by weight or more, and still more preferably 20% by weight or more.

Also, this proportion is 99% by weight or less, more preferably 98% by weight or less, and still more preferably 97% by weight or less. When the proportion of the ionic compound is 99% by weight or less, not only formation of the porous layer is facilitated, but also physical strength can be imparted to the porous layer. On the other hand, from the viewpoint of further enhancing the physical strength, the proportion being less than 50% by weight is preferable, the proportion of 45% by weight or less is more preferable, and the proportion of 40% by weight or less is furthermore preferable.

The proportion of the ionic compound in the entire separator for electricity storage devices is preferably 5% by weight or more, more preferably 10% by weight or more, and still more preferably 15% by weight or more. When the proportion of the ionic compound in the entire separator is 5% by weight or more, the heat resistance of the separator tends to be improved. Moreover, this proportion is preferably 95% by weight or less, more preferably 90% by weight or less, and still more preferably 85% by weight or less. If the proportion of the ionic compound in the entire separator is 95% by weight or less, fall off of the ionic compound from the separator tends to be preventable.

Since the specific gravity of the ionic compound is generally higher than the specific gravity of the polyolefin resin, it may also be more appropriate to denote the proportion of the ionic compound in the separator for electricity storage devices as % by volume rather than % by weight. The aforementioned proportion is preferably 2% by volume or more to 90% by volume or less, more preferably 5% by volume or more and 80% by volume or less, and still more preferably 8% by volume or more and 70% by volume or less. When the proportion of the ionic compound is 2% by volume or more, the heat resistance of the separator tends to be improved. Moreover, when it is 90% by volume or less, fall off of the ionic compound from the separator tends to be preventable.

An average particle size of the ionic compound is preferably 5 nm or more and 600 nm or less, more preferably 10 nm or more and 500 nm or less, and still more preferably 20 nm or more and 400 nm or less. The average particle size refers to an average value of particle sizes of 10 ionic compounds which can be confirmed in a visual field image when the porous layer is observed at magnification of 30,000× using a scanning electron microscope. When calculating the average particle size, the particle size of each particle being present in the form of single particle, is used, and if the particles are aggregated, the particle size of the primary particle constituting the aggregate can be adopted.

When the average particle size of the ionic compound is 5 nm or more, the membrane thickness and the pore distribution of the separator are uniformed, and the input/output characteristics of the electricity storage device are improved, which is preferable. Also, when the average particle size is 600 nm or less, the pore size of the separator is uniformed, and any large pore portion is hardly formed locally, thereby improving safety of the separator for electricity storage devices.

As the ionic compound, an ionic compound that is surface-treated with a surface treatment agent is used to improve the dispersibility to the polyolefin resin. Examples of this surface treatment include treatments with saturated fatty acid and/or a salt thereof (saturated fatty acid salt), unsaturated fatty acid and/or a salt thereof (unsaturated fatty acid salt), polysiloxane, a silane coupling agent, etc. From the viewpoint of dispersibility into the polyolefin resin, as a surface treatment agent for the ionic compound, it is preferably saturated fatty acid and a salt thereof, and unsaturated fatty acid and a salt thereof, more preferably saturated fatty acid of 8 or more carbon atoms and a salt thereof, and unsaturated fatty acid of 8 or more carbon atoms and a salt thereof, and still more preferably saturated fatty acid of 12 or more carbon atoms and a salt thereof, and unsaturated fatty acid of 12 or more carbon atoms and a salt thereof. When the ionic compound is surface-treated with the aforementioned surface treatment agents, the ionic compound is highly dispersed in the polyolefin resin, and the generation of macrovoids originated from the aggregates is suppressed, which is preferred from the standpoint of improving safety of electricity storage devices.

Specific examples of the saturated fatty acid include butyric acid (4 carbon atoms), valeric acid (5 carbon atoms), caproic acid (6 carbon atoms), enanthic acid (7 carbon atoms), caprylic acid (8 carbon atoms), pelargonic acid (9 carbon atoms), capric acid (10 carbon atoms), lauric acid (12 carbon atoms), myristic acid (14 carbon atoms), pentadecyl acid (15 carbon atoms), palmitic acid (16 carbon atoms), margaric acid (17 carbon atoms), stearic acid (18 carbon atoms), arachidic acid (20 carbon atoms), behenic acid (22 carbon atoms), lignoceric acid (24 carbon atoms), cerotic acid (26 carbon atoms), montanic acid (28 carbon atoms), melissic acid (30 carbon atoms), etc. As the cation of the saturated fatty acid salt, various cations can be used without particular limitation, however, alkali metal ions and/or alkaline earth metal ions having high stability in the electricity storage device are preferable.

As the unsaturated fatty acid, specific examples thereof include crotonic acid (4 carbon atoms), myristoleic acid (14 carbon atoms), palmitoleic acid (16 carbon atoms), oleic acid (18 carbon atoms), vaccenic acid (18 carbon atoms), linoleic acid (18 carbon atoms), linolenic acid (18 carbon atoms), eleostearic acid (18 carbon atoms), mead acid (20 carbon atoms), arachidonic acid (20 carbon atoms), nervonic acid (24 carbon atoms), etc. Although various cations can be used without particular limitation as the cation of the unsaturated fatty acid salt, alkali metal ions and/or alkaline earth metal ions having high stability in the electricity storage device are preferable.

The surface hydrophilicity of the ionic compound is an index indicating the degree of hydrophilicity and hydrophobicity of the filler surface. Specifically, when the specific surface area of the ionic compound is measured by a gas adsorption method, the specific surface area ($S_{Water}$) of the ionic compound obtained when water vapor is used as the adsorbate, is divided by the specific surface area ($S_{Nitrogen}$) of the ionic compound obtained when nitrogen is used as the adsorbate to calculate the surface hydrophilicity ($S_{Water}/S_{Nitrogen}$). If the filler surface is hydrophilic, $S_{Water}$ becomes large, and therefore $S_{Water}/S_{Nitrogen}$ becomes large. Also, if the filler surface is hydrophobic, $S_{Water}$ becomes small, and $S_{Water}/S_{Nitrogen}$ becomes small. It should be noted here that the measurement of the specific surface area is carried out according to JISZ 8830: 2013.

The degree of surface hydrophilicity of the ionic compound is 0.10 or more, preferably 0.15 or more, more preferably 0.20 or more, and still more preferably 0.25 or more. When the degree of surface hydrophilicity is 0.10 or more, affinity of the ionic compound to an electrolytic solution is enhanced, and the ion conductivity of the separator is improved. Also, the degree of surface hydrophilicity of the ionic compound is 0.80 or less, preferably 0.75 or less, more preferably 0.70 or less, and still more preferably 0.65 or less. When the degree of surface hydrophilicity is 0.80 or less, the ionic compound can be highly dispersed in polyolefin resin, capable of suppressing generation of aggregation.

The ratio of the weight loss of the ionic compound at 350° C. to that at 550° C. is a value obtained by dividing the weight loss of the ionic compound at 350° C. in thermogravimetry (TG) by the weight loss of the ionic compound at 550° C. When the surface-treated ionic compound is heated, in the temperature range from normal temperature to 350° C., the weight loss mainly occurs due to dehydration and sublimation of the surface treatment agent having no interaction with the filler surface, and in the temperature range of 350 to 550° C., the thermal decomposition of the surface treatment agent interacting with the filler surface mainly occurs. Namely, when the proportion of the surface treatment agent acting on the filler surface is large, the weight loss at 350° C. is small, and the weight loss at 550° C. is large, resulting in the small ratio of the weight loss at 350° C. to that and at 550° C. Since the surface treatment agent not acting on the filler surface has a high likelihood of eluting into the plasticizer in the manufacturing step of the separator and causing adverse effects on the production equipment, the weight loss ratio is preferably small. It is noted here that the thermogravimetric measurement is carried out by raising the temperature from room temperature (23° C.) to 600° C. at a rate of 10° C./minute in a nitrogen atmosphere using a general-purpose thermogravimetric measurement apparatus.

The ratio of the weight loss of the ionic compound at 350° C. to that at 550° C. is 0.03 or more, preferably 0.05 or more, and more preferably 0.07 or more. The ratio of the weight loss of the ionic compound at 350° C. to that at 550° C. may be 0.10 or more, 0.12 or more, or 0.15 or more. When the weight loss ratio is 0.03 or more, it is possible to use a filler containing adsorbed water. Therefore, for example, the manufacturing cost of the separator can be easily reduced. On the other hand, the weight loss ratio is 0.70 or less, preferably 0.60 or less, and more preferably 0.50 or less. The weight loss ratio may be 0.45 or less or 0.40 or less. When the weight loss ratio is 0.70 or less, the dispersibility of the ionic compound for the polyolefin resin can be improved as well as the elution of the surface treatment agent into a plasticizer can be suppressed.

The surface treatment amount of the ionic compound is 0.1% by weight or more, preferably 0.2% by weight or more, and more preferably 0.3% by weight or more, based on 100% by weight of the surface-treated ionic compound. When the surface treatment amount of the ionic compound is 0.1% by weight or more, affinity of the ionic compound to the polyolefin resin is improved, and the aggregation of the ionic compound can be suppressed. Also, the surface treatment amount of the ionic compound is 10% by weight or less, preferably 9% by weight or less, and more preferably 8% by weight or less. When the surface treatment amount of the ionic compound is 10% by weight or less, the surface treatment agent can act on the ionic compound uniformly, so that the surplus surface treatment agent can be reduced. When the use amount of the surface treatment agent is in the above range, the safety of electricity storage devices can be easily improved.

The method for treating the ionic compound with the surface treating agent is not particularly restricted, but a method (solid phase method) for directly adding the surface treating agent to the ionic compound; a method (wet method) for adding the surface treatment agent after dispersing the ionic compound in a medium such as water or alcohol, etc., may be applied. From the viewpoint of uniformly carrying out the surface treatment, a method using the medium is preferable, and the temperature of the medium is preferably a temperature of the boiling point of the medium −60° C. or higher, more preferably a temperature of the boiling point of the medium −50° C. or higher, and still more preferably a temperature of the boiling point of the medium −40° C. or higher. On the other hand, from the viewpoint of workability, it is preferable to carry out the surface treatment at a temperature equal to or lower than the boiling point of the medium −10° C. or lower.

<<Separator for Electricity Storage Devices>>

The separator for electricity storage devices is an electronically insulating membrane disposed between a positive electrode and a negative electrode of the electricity storage device and has a porous structure in which the large number of extremely fine pores gather to form dense percolated pores, thereby capable of exhibiting ion conductivity by impregnating an electrolytic solution. The separator for electricity storage devices manufactured by the method of the present embodiment itself functions as the separator for electricity storage devices, but if necessary, a surface of the separator may be coated with an inorganic material and/or organic material to form a laminated membrane. The separator for electricity storage devices of the present embodiment has high ion conductivity and heat resistance, and has a small amount of metal impurities, thereby enabling to improve input/output characteristics and safety of the electricity storage device.

The membrane thickness of the separator for electricity storage devices is preferably 0.1 µm or more and 100 µm or less, more preferably 1 µm or more and 50 µm or less, and still more preferably 3 µm or more and 25 µm or less. A membrane thickness of 0.1 µm or more is preferable from the viewpoint of mechanical strength, and a membrane thickness of 100 µm or less is preferable from the viewpoint of increasing the capacity of the electricity storage device. The membrane thickness of the separator can be adjusted by controlling the die lip gap, the stretching ratio in the stretching step, etc.

The average pore size of the separator for electricity storage devices is preferably 10 nm or more and 150 nm or less, more preferably 20 nm or more and 130 nm or less, and still more preferably 30 nm or more and 110 nm or less, from the viewpoint of achieving both safety and input/output characteristics of the electricity storage device. The average pore size can be adjusted by controlling the composition ratio, cooling rate of an extruded sheet, stretching temperature, stretching ratio, heat setting temperature, stretching ratio during heat setting, relaxation ratio during heat setting, or by combining thereof.

The average pore size of the separator for electricity storage devices can be measured by a gas-liquid method. Specifically, it has been known that a fluid inside a capillary follows the Knudsen flow when the mean free path of the fluid is larger than the pore size of the capillary, and when it is smaller, the fluid follows the Poiseuille flow. Then, it is assumed that the flow of air follows the Knudsen flow in measurement of the air permeability of the separator, and the flow of water follows the Poiseuille flow in the measurement of water permeability.

In this case, the average pore size d (μm) of the porous membrane and the tortuosity factor $\tau_a$ (dimensionless) are calculated with the air permeation rate constant $R_{gas}$ (m$^3$/(m$^2$·second·Pa)), the water permeation rate constant $R_{liq}$ (m$^3$/(m$^2$·second·Pa)), molecular velocity of air v (m/second), viscosity of water η (Pa·second), standard pressure $P_S$ (=101325 Pa), porosity ε (%), membrane thickness L (μm), according to the following equation:

$$d = 2v \times (R_{liq}/R_{gas}) \times (16\eta/3P_S) \times 10^6$$

$$\tau a = (d \times (\varepsilon/100) \times v/(3L \times P_S \times R_{gas}))^{1/2}$$

Here, $R_{gas}$ was determined from the air permeability (second) using the following equation:

$$R_{gas} = 0.0001/(\text{air permeability} \times (6.424 \times 10^{-4}) \times (0.01276 \times 101325))$$

Also, $R_{liq}$ was determined from the water permeability (cm$^3$/(cm$^2$·second·Pa)) using the following equation:

$$R_{liq} = \text{water permeability}/100$$

Here, the water permeability was determined as follows. A separator previously immersed in ethanol was set in a stainless steel cell with a diameter of 41 mm for liquid permeation, and after the ethanol in the separator was washed with water, water was allowed to permeate with a differential pressure of about 50,000 Pa. From the amount (cm$^3$) of water permeated for 120 seconds, the water permeability per unit time·unit pressure·unit area, was calculated, which was taken as the water permeability.

Also, v was calculated with the gas constant R (=8.314 J/(K·mol)), absolute temperature T (K), circumferential ratio π, and average molecular weight of air M (=2.896×10$^{-2}$ kg/mol), using following equation:

$$v = ((8R \times T)/(\pi \times M))^{1/2}$$

The porosity of the separator for electricity storage devices is preferably 25% or more to 95% or less, more preferably 30% or more to 85% or less, still more preferably 35% or more to 75% or less, and particularly preferably 40% or more to 65% or less. A porosity of 25% or more is preferable from the viewpoint of improving ion conductivity, and a porosity of 95% or less is preferable from the viewpoint of mechanical strength. The porosity of the separator may be adjusted by controlling the mixing ratio of the polyolefin resin composition and the plasticizer, stretching temperature, stretching ratio, heat setting temperature, stretching ratio during heat setting, relaxation ratio during heat setting, or by combining these properties.

The air permeability of the separator for electricity storage devices is preferably 10 seconds/100 ml or longer and 500 seconds/100 ml or shorter, more preferably 20 seconds/100 ml or longer and 400 seconds/100 ml or shorter, and further preferably 30 seconds/100 ml or longer and 300 seconds/100 ml or shorter. When the air permeability is 10 seconds/100 ml or longer, the self-discharge is reduced when used as a separator for electricity storage devices, and when it is 500 seconds/100 ml or shorter, favorable input/output characteristics are obtainable, which is preferred.

The puncture strength of the separator for electricity storage devices is preferably 100 gf or more, more preferably 150 gf or more, still more preferably 200 gf or more, preferably 600 gf or less, more preferably 550 gf or less, and still more preferably 500 gf or less. Adjusting the puncture strength to 100 gf or more is preferable from the viewpoint of suppressing membrane rupture due to the active material, etc., that dropped off when manufacturing an electricity storage device, and is also preferable to reduce concern for short circuit due to swelling and shrinkage of electrodes accompanied by charge and discharge. On the other hand, it is preferable to adjust the puncture strength to 600 gf or less from the viewpoint allowing to reduce shrinkage due to the orientation relaxation when heating.

The viscosity-average molecular weight of the separator for electricity storage devices is preferably 200,000 or more and 5,000,000 or less, more preferably 300,000 or more and 3,000,000 or less, and still more preferably 400,000 or more and 1,000,000 or more. When the viscosity-average molecular weight is 200,000 or more, the melt tension in melt molding is increased, thereby improving moldability, and there is a likelihood of high strength due to entanglement between polyolefin resins. The viscosity-average molecular weight of 5,000,000 or less facilitates melt-kneading uniformly, and the sheet tends to become excellent in moldability, particularly thickness stability. Furthermore, when used as a separator for electricity storage devices, if the viscosity-average molecular weight of the separator is less than 1,000,000, pores have a likelihood of being clogged when a temperature rises, which is preferable because a favorable fuse function tends to be obtained.

The reason for the small amount of metal impurities contained in the separator for electricity storage devices of the present embodiment is not necessarily clear, and is not limited to the action or principle described in this paragraph, however it is conjectured because in the separator of the present embodiment, the surface treatment agent that modifies the surface of the ionic compound does not dissolve into the plasticizer. It is desirable that the hydrophilic portion of the surface treatment agent interacts with the surface of the ionic compound, and the hydrophobic portion of the surface treatment agent is situated outside the filler. However, depending on the method of surface treatment, the surface treatment agent is conjectured to aggregate for micelle formation. When the micelles contact with the plasticizer, the surface treatment agent dissolves in the plasticizer, and a metal of the manufacturing equipment is conjectured to elute by the action of the surface treatment agent, generating a metal impurity.

<<Manufacturing Method of Separator for Electricity Storage Device>>

In the method for manufacturing the separator for electricity storage devices according to the present embodiment, a plasticizer is extracted from the kneaded product containing the plasticizer having an infrared (IR) absorbance ratio $A_{1700\ to\ 1800}/A_{2700}$ of 0.01 or more and 0.25 or less, the polyolefin resin, and the ionic compound. Extraction of the plasticizer from such a kneaded product enables to suppress metal elution from a manufacturing facility, reduce the amount of metal impurities mixed in the separator for electricity storage devices, and improve safety of electricity storage devices. Moreover, the separator can also be manufactured with ease utilizing commercially available plasticizers. The micropores formed by the extraction of the plasticizer contribute to exhibit ion conductivity of the separator that is impregnated with a nonaqueous electrolytic solution.

Although an example will be described regarding the method for manufacturing the separator for electricity storage devices according to the present embodiment, it is not necessarily restricted to this example. The method for manufacturing the separator for electricity storage devices may include, for example, the following steps:
(1) a step of melt-kneading the polyolefin resin, ionic compound, and plasticizer to obtain a kneaded product,
(2) a step of transferring the kneaded product, molding it into sheet form, and then cooling and solidifying it,
(3) a step of stretching the sheet molding at least in a uniaxial direction at a stretching ratio by area of 20 times or more and less than 200 times, and
(4) a step of extracting the plasticizer from the sheet molding after the stretching step.

In step (1), the polyolefin resin, ionic compound, and plasticizer are melt-kneaded. As a melt-kneading method, an example thereof includes such as feeding the polyolefin resin, the ionic compound and, if necessary, other additives into a resin-kneading apparatus such as an extruder, kneader, laboplastmill, kneading roll, Banbury mixer, etc., and introducing and kneading the plasticizer by arbitrary ratios while heat-melting the resin components.

The IR absorbance ratio $A_{1700\ to\ 1800}/A_{2700}$ of at least one type of the plasticizers is 0.01 or more and 0.25 or less, preferably 0.02 or more and 0.23 or less, and more preferably 0.03 or more and 0.21 or less. When the IR absorbance ratio $A_{1700\ to\ 1800}/A_{2700}$ is 0.25 or less, the amount of metal impurities mixed in the separator is small because metal elution from a manufacturing facility is suppressed, thereby improving safety of the electricity storage devices. Moreover, a commercially available plasticizer can be utilized if the IR absorption ratio is 0.01 or more, facilitating to manufacture the separator.

The IR absorbance ratio $A_{1700\ to\ 1800}/A_{2700}$ of the plasticizer is a ratio of the maximum absorbance $A_{1700\ to\ 1800}$ in the transmission IR spectrum of the plasticizer within the range of 1700 to 1800 cm$^{-1}$, to the absorbance at 2700 cm$^{-1}$ $A_{2700}$. The IR absorbance of the plasticizer is measured after kneading the plasticizer, polyolefin resin and ionic compound, and more specifically, after melt-kneading the polyolefin resin, ionic compound, and plasticizer, the transmission IR spectrum of the plasticizer that bleeds out from the melt-kneaded product is measured. $A_{2700}$ is an infrared absorption derived from the plasticizer, $A_{1700\ to\ 1800}$ is an infrared absorption derived from a surface treatment that is occasionally detected, and an IR absorbance ratio $A_{1700\ to\ 1800}/A_{2700}$ is an index of the amount of the surface treatment agent that has dissolved into the plasticizer.

$A_{1700\ to\ 1800}$ is defined as the maximum value of absorbance in the transmission IR spectrum of the plasticizer within the range of 1700 to 1800 cm$^{-1}$. From the viewpoint of improving the resolution, it is desirable to measure the transmission IR spectrum of the plasticizer by adjusting the measurement conditions so that the absorbance at 2700 cm$^{-1}$ is 0.5 or more and 1.0 or less. The transmittance IR spectrum can be easily measured using a general Fourier transform infrared spectrophotometer.

Although the plasticizer is not particularly restricted, however, a non-volatile solvent that enables to form a uniform solution above the melting point of polyolefin resin is preferably used. Specific examples of such a non-volatile solvent include, for example, hydrocarbons such as liquid paraffin, paraffin wax, etc.; esters such as dioctyl phthalate, dibutyl phthalate, etc.; higher alcohols such as oleyl alcohol, stearyl alcohol, etc. These plasticizers may be recovered by operations such as distillation, etc., after the extraction, and may be reused. Furthermore, the polyolefin resin, ionic compound, other additives, and plasticizer are preferably preliminarily kneaded at a prescribed proportion thereof using a Henschel mixer, etc., before introduced into a resin-kneading apparatus. More preferably, in the pre-kneading, the plasticizer is partially introduced, and the remaining plasticizer is kneaded while being appropriately heated and side-fed to the resin kneading apparatus. By using such a kneading method, the dispersibility of the plasticizer is enhanced, and when stretching a sheet molding of the melt-kneaded product of the resin composition and the plasticizer in a later step, the sheet molding tends to be stretchable at a high ratio without rupture of the membrane.

Among the plasticizers, liquid paraffin is preferable because in the case that the polyolefin resin is polyethylene or polypropylene, the liquid paraffin is highly compatible with these, and even if the melt-kneaded product is stretched, interfacial stripping between the resin and the plasticizer hardly occurs, facilitating to implement uniform stretching.

The proportion of the polyolefin resin, the ionic compound, and the plasticizer is not particularly limited provided these can be melt-kneaded uniformly and molded into sheet form. For example, the weight fraction of the plasticizer in the composition composed of the polyolefin resin, the ionic compound, and the plasticizer is preferably 10 to 90% by weight, and more preferably 20 to 80% by weight. When the weight fraction of the plasticizer is 90% by weight or less, the melt tension during melt-molding tends to be sufficient for improving moldability. On the other hand, when the weight fraction of the plasticizer is 10% by weight or more, no scission of the polyolefin molecular chains takes place even when the mixture of the polyolefin resin composition and the plasticizer is stretched at a high ratio, facilitating to form a uniform and microporous structure and also to increase strength.

In step (2), the melt-kneaded product is formed into sheet form. As a method for manufacturing a sheet molding, an example thereof includes such as extruding a melt-kneaded product in sheet form via a T die, etc., bringing the sheet in contact with a heat conductor, and cooling to a temperature sufficiently lower than the crystallization temperature of the resin component followed by solidification thereof. As a heat conductor used for cooling solidification, a metal, water, air, plasticizer, etc., are included. Among these, a metal roll is preferable due to high heat conduction efficiency thereof. Also, when the extruded kneaded-product is subjected to contact with the metal roll, it is preferable to sandwich it between the rolls, from which not only the efficiency of heat conduction is further increased, but also the membrane strength is increased due to orientation of the sheet, which further tends to improve the surface smoothness of the sheet. The die lip gap when extruding the melt-kneaded product in sheet form from the T-die is preferably 200 μm or more and 3,000 μm or less, and more preferably 500 μm or more and 2,500 μm or less. When the die-lip gap is 200 μm or more, the resin waste, etc., are reduced, the influence on membrane quality such as streaks and defects is small, and the risk of membrane rupture, etc., can be reduced in the subsequent stretching step. On the other hand, when the die lip gap is 3,000 μm or less, the cooling rate is fast, which enables to prevent cooling unevenness, and the thickness stability of the sheet can be maintained.

Also, the sheet molding may be subjected to rolling. The rolling can be carried out by, for example, a press method using a double belt press machine, etc. By the rolling, the orientation of in particular, the surface layer portion can be promoted. The rolling ratio by area is preferably more than one time and three times or less, and more preferably more than one time and two times or less. When the rolling ratio is more than one time, the plane orientation tends to be promoted and the membrane strength of the finally obtained porous membrane tends to be increased. On the other hand, when the rolling ratio is three times or less, the difference in orientation between the surface layer portion and the inside of the center is small, which tends to facilitate formation of a uniform porous structure in the thickness direction of the membrane.

In step (3), the aforementioned sheet molding is subjected to stretching. Stretching may also be carried out after extracting the plasticizer from the sheet molding. Furthermore, it may also be carried out before and after extracting the plasticizer from the aforementioned sheet molding.

Although either uniaxial stretching or biaxial stretching can be suitably applied as the stretching treatment, biaxial stretching is preferable from the viewpoint of improving the strength of the obtained separator. Upon biaxial stretching of the sheet molding at a high stretching ratio, the molecules are oriented in a plane direction, and the separator finally obtained hardly tears and has high puncture strength. Examples of the stretching method include such as simultaneous biaxial stretching, sequential biaxial stretching, multistage stretching, multiple-time stretching, etc. Simultaneous biaxial stretching is preferable from the viewpoint of improvement on puncture strength, uniformity of stretching, and fuse characteristics. Further, from the viewpoint of controllability of plane orientation, sequential biaxial stretching is preferred.

Here, simultaneous biaxial stretching refers to a stretching method in which MD (machine direction of continuous separator processing) stretching and TD (transverse direction crossing the MD of the separator at an angle of 90° are simultaneously carried out, and the stretching ratio in each direction may be different. Sequential biaxial stretching is referred to as a stretching method in which MD stretching and TD stretching are each carried out independently, and upon MD stretching or TD stretching, the other direction is in a non-constrained state or in anchored state with fixed length.

The stretching ratio is preferably in the range of 20 times or more and 200 times or less in terms of a ratio by area, and more preferably in the range of 25 times or more and 150 times or less. The stretching ratio in each axial direction is preferably 4 times or more and 15 times or less in MD and 4 times or more and 15 times or less in TD, and more preferably 5 times or more and 12 times or less in MD and 5 times or more and 12 times or less in TD. When the total ratio by area is 25 times or more, sufficient strength tends to be imparted to the obtained separator, while when the total ratio by area is 200 times or less, membrane rupture during the stretching step is prevented and high productivity tends to be achieved.

In step (4), the plasticizer is removed from the sheet molding to form a separator. As a method for removing the plasticizer, an example thereof includes such as immersing the sheet molding in an extraction solvent to extract the plasticizer followed by fully drying. The plasticizer may be extracted either batchwise or continuously. In order to suppress the shrinkage of the separator, it is preferable to constrain the edges of the sheet molding in a series of steps such as immersion and drying. Moreover, it is preferable to adjust the amount of residual plasticizer in the separator to less than 1% by weight with respect to the weight of the entire separator.

As an extraction solvent used when extracting a plasticizer, it is preferable to use a solvent which is a poor solvent for the polyolefin resin and a good solvent for the plasticizer and has a boiling point lower than the melting point of the polyolefin resin. Examples of such extraction solvents include hydrocarbons such as n-hexane, cyclohexane, etc.; halogenated hydrocarbons such as methylene chloride, 1,1,1-trichloroethane, etc.; non-chlorinated halogenated solvents such as hydrofluoroether, hydrofluorocarbon, etc.; alcohols such as ethanol, isopropanol, etc.; ethers such as diethyl ether, tetrahydrofuran, etc.; and ketones such as acetone, methyl ethyl ketone, etc. These extraction solvents may be recovered by the operations such as distillation, etc., and may be reutilized.

In order to suppress shrinkage of the separator, heat treatment can also be carried out with the aim of heat setting after the stretching step or after formation of the separator. Moreover, the separator may be subjected to post-treatments such as hydrophilization treatment with a surfactant, etc., crosslinking treatment with an ionizing radiation, etc.

The separator is preferably subjected to heat treatment for the purpose of heat setting from the viewpoint of suppressing the shrinkage. As a method of heat treatment, with the aim of adjusting physical properties, examples of the heat treatment include stretching operation carried out at a prescribed temperature atmosphere and prescribed stretching ratio, and/or relaxation operation carried out at a prescribed temperature atmosphere and prescribed relaxation ratio for the purpose of reduction of stretching stress. The relaxation operation may be carried out following the stretching operation. These heat treatments can be carried out using a tenter or a roll stretcher.

The stretching operation is preferably carried out by stretching 1.1 times or more, more preferably 1.2 times or more in MD and/or TD of the membrane, from the viewpoint of obtaining a porous membrane with higher strength and higher porosity. The relaxation operation is a shrinking operation in MD and/or TD of the membrane. The relaxation ratio is referred to as a value obtained by dividing the dimension of the membrane after the relaxation operation by the dimension of the membrane before the relaxation operation. When relaxation was carried out in both MD and TD, the relaxation ratio means a value obtained by multiplying the relaxation ratio of MD and the relaxation ratio of TD. The relaxation ratio is preferably 1.0 or less, more preferably 0.97 or less, and still more preferably 0.95 or less. The relaxation ratio is preferably 0.5 or more from the viewpoint of membrane quality. The relaxation operation may be carried out in both MD and TD, however, may be carried out in either MD or TD.

The stretching and relaxation operations after this plasticizer extraction are preferably carried out in TD. In contrast to the melting point (hereinafter also referred to as "Tm") of the polyolefin resin, the temperature of the stretching and relaxation operations is preferably Tm−20° C. or higher and Tm+20° C. or lower, and more preferably Tm−10° C. or higher and Tm+10° C. or lower. The temperature of the stretching and relaxation operations in the aforementioned range is preferable from the viewpoint of the balance of reduction of heat shrinkage and the porosity.

<<Electricity Storage Device>>

The electricity storage device of the present embodiment is provided with a positive electrode, negative electrode, and the separator for electricity storage devices manufactured by the method of the present embodiment. Specific examples of the electricity storage device include a lithium secondary battery, lithium ion secondary battery, sodium secondary battery, sodium ion secondary battery, magnesium secondary battery, magnesium ion secondary battery, calcium secondary battery, calcium ion secondary battery, aluminum secondary battery, aluminum ion secondary battery, nickel metal hydride battery, nickel cadmium battery, electric double layer capacitor, lithium ion capacitor, redox flow battery, lithium sulfur battery, lithium air battery, zinc air battery, etc. Among the aforementioned batteries, from the viewpoint of practicality, a lithium secondary battery, lithium ion secondary battery, nickel metal hydride battery, or lithium ion capacitor is preferable, and a lithium-ion secondary battery is more preferable.

The electricity storage device of the present embodiment may be manufactured by the method including the following steps:

(1) a step of combining the positive electrode and the negative electrode together via the aforementioned separator for electricity storage devices and loading these into an outer package; and (2) a step of injecting a nonaqueous electrolytic solution into the outer package and sealing the outer package.

Specifically, the electricity storage device can be fabricated by combining the positive electrode and the negative electrode described above via the separator, winding as necessary to form a laminated electrode body or a wound electrode body, loading it into an outer package, connecting the positive and negative electrodes to positive and negative electrode terminals of the outer package via a lead, etc., and further injecting a nonaqueous electrolytic solution containing a nonaqueous solvent such as cyclic carbonate and/or linear carbonate and an electrolyte such as lithium salt, etc., followed by sealing the outer package. The outer package of the electricity storage device is not particularly limited, but a metal can container or a laminate container made of a metal foil laminate film, etc., can be suitably used. The shape of the storage device is not particularly limited, and for example, a cylindrical, square, coin type, flat, or sheet may be employed.

<<Positive Electrode>>

The positive electrode is prepared by adding appropriate amounts of a conductive assistant such as acetylene black, etc., and binder such as polyvinylidene fluoride, etc., to a positive electrode active material to prepare a positive electrode mixture, coating a current collector such as an aluminum foil, etc., with the mixture and drying, and then applying pressure to adhere the positive electrode mixture layer on the current collector. It is noted that the method for preparing the positive electrode is not limited to the method exemplified above.

The positive electrode active material is not particularly restricted, but from the viewpoint of structural stability of the positive electrode active material, it is preferably complex oxide of a layered oxide cathode active material represented by the chemical formula: $LiNi_xCo_yMa_{1-x-y}O_2$ wherein, Ma represents one or more selected from the group consisting of Mn and Al, $0 \leq x \leq 1$, $0 \leq y \leq 1$, and $x+y \leq 1$; spinel-type oxide cathode active material represented by the chemical formula: $LiMn_{2-x}Mb_xO_4$ wherein, Mb represents one or more selected from the group consisting of transition metals, and $0.2 \leq x \leq 0.7$; $Li_2McO_3$ and $LiMdO_2$ wherein, Mc and Md each independently represent one or more selected from the group consisting of transition metals, and one or more positive electrode active materials selected from the group consisting of a Li-rich layered oxide cathode material represented by the chemical formula: $zLi_2McO_3\text{-}(1\text{-}z)LiMdO_2$ wherein Mc and Md each independently represent one or more selected from the group consisting of transition metals, and $0.05 \leq z \leq 0.95$; olivine-type cathode active material represented by $LiMe_{1-x}Fe_xPO_4$ wherein, Me represents one or more selected from the group consisting of Mn and Co, and $0 \leq x \leq 1$, and $Li_2MfPO_4F$ wherein, Mf represents one or more selected from the group consisting of transition metals, are included.

As the layered oxide cathode active material represented by the chemical formula: $LiNixCo_yMa_{1-x-y}O_2$ wherein, Ma represents one or more selected from the group consisting of Mn and Al, $0 \leq x \leq 1$, $0 \leq y \leq 1$, and $x+y \leq 1$ from the viewpoint of the structural stability, it preferably has a composition represented by $LiNi_xCo_yMn_{1-x-y}O_2$ wherein, $0 \leq x \leq 1$, $0 \leq y \leq 1$ and $x+y \leq 1$ or $LiNi_xCo_yAl_{1-x-y}O_2$ wherein, $0.7 \leq x \leq 1$, $0 \leq y \leq 0.3$, and $x+y \leq 1$. As more preferable compositions, $LiCoO_2$, $LiNi_xCo_yMn_{1-x-y}O_2$ wherein, $0.3 \leq x \leq 1$, $0 \leq y \leq 0.4$, and $x+y \leq 1$ and $LiNi_{0.85}Co_{0.1}Al_{0.05}O_2$, are included.

<<Negative Electrode>>

The negative electrode is prepared by adding appropriate amounts of a thickener such as carboxymethyl cellulose, etc., and binder such as styrene butadiene rubber, etc., to a negative electrode active material to prepare a negative electrode mixture, coating a current collector such as a copper foil, etc., with the mixture followed by drying, and then applying pressure to adhere the negative electrode mixture layer on the current collector. It is noted that, the method for preparing the negative electrode is not limited to the method exemplified above.

In the present embodiment, the negative electrode active material that can be used for the negative electrode is not particularly limited, however, alloy compounds such as Al, Si, Sn, etc.; metal oxides such as CuO, CoO, etc.; lithium-containing compounds such as lithium titanate, etc.; carbon materials, etc., may be used. From the viewpoint of improving the energy density of the electricity storage device, a carbon material capable of intercalating and releasing lithium ions at a relatively low potential is preferred. Such a carbon material is not particularly restricted however, examples thereof include hard carbon, soft carbon, artificial graphite, natural graphite, pyrolytic carbon, coke, glassy carbon, burning product of an organic polymer compound, and burning products of an organic natural product, carbon fiber, mesocarbon microbeads, carbon black, etc.

When the carbon material is used as the negative electrode active material, the interlayer distance $d_{002}$ of (002) plane of the carbon material is preferably 0.37 nm or less, more preferably 0.35 nm or less, and still more preferably 0.34 nm or less. The lower limit of $d_{002}$ is not particularly restricted but is theoretically about 0.335 nm. The size of the crystallite in the c-axis direction of the carbon material is preferably 3 nm or more, more preferably 8 nm or more, and still more preferably 25 nm or more. Although the upper limit of the size of the crystallite is not particularly limited, it is generally about 200 nm. Moreover, the average particle size of the carbon material is preferably 3 μm or more and 15 μm or less, more preferably 5 μm or more and 13 μm or less. Also, the purity of the carbon material is preferably 99.9% or higher.

The electricity storage device of the present embodiment has high input/output characteristics and high durability and also is excellent in safety, and therefore it is not only suitable for use as an automotive onboard power source, but also widely utilized as a power source for consumer appliances such as a smartphone, drone, etc., or as a stationary power source.

EXAMPLE

The present embodiments will be described below in more detail by way of Examples, and the present invention is not limited to the Examples unless the present invention depart from the scope of the gist thereof. It is noted that the analytical method and evaluation methods used in Examples and Comparative Examples are as described below.

(1) Membrane Thickness (μm)

The membrane thickness of the sample was measured at a room temperature of 23° C. using a micro thickness gauge (type KBM, manufactured by Toyo Seiki Seisaku-sho, Ltd.).

(2) Porosity (%)

A 10 cm×10 cm square sample was cut out from the separator, the volume ($cm^3$) and weight (g) of the sample were measured, and the porosity was calculated from these and the membrane density ($g/cm^3$) using the following equation:

Porosity (%)=(volume−weight/membrane density)/volume×100

It is noted that the membrane density was used as the value calculated from each density of the polyolefin resin and the ionic compound, and the mixing ratio thereof.

(3) Air Permeability (second/100 ml)

Air permeability of a sample was measured using a Gurley type air permeability tester (manufactured by Toyo Seiki Seisaku-sho, Ltd.), according to JIS P-8117.

(4) Puncture Strength (gf)

A separator was set with a sample holder having an opening diameter of 11.3 mm, using a handy compression tester "KES-G5" (manufactured by Kato Tech Co., Ltd.). Subsequently, a puncture test was carried out by contacting the center of the set separator and a needle tip with curvature radius of 0.5 mm under conditions with a puncture speed of 2 mm/second and an atmospheric temperature of 25° C., and the puncture strength (gf) was obtained as the maximum puncture load.

(5) IR Spectrum Measurement of Plasticizer

The transmission IR spectrum of the plasticizer which had been bled out from the kneaded product prepared by the method described in the following Examples and Comparative Examples was measured using a Fourier Transform Infrared Spectrophotometer "670 FTIR" (manufactured by Agilent Technologies Inc.). By dividing $A_{1700\ to\ 1800}$ with $A_{2700}$ wherein the maximum absorbance value in the range of 1700 to 1800 $cm^{-1}$ in the transmitted IR spectrum obtained was $A_{1700\ to\ 1800}$ and the absorbance at 2700 $cm^{-1}$ was $A_{2700}$, the IR absorbance ratio $A_{1700\ to\ 1800}/A_{2700}$ was calculated.

(6) Evaluation of Metal Elution Amount 50 g of the kneaded product prepared by the method described in the following Examples and Comparative Examples was weighted, and a test piece (carbon steel, width: 10 mm, length: 50 mm, thickness: 5 mm) simulating a manufacturing equipment of the separator was wrapped with the kneaded product, and sealed into a PFA bottle. The PFA bottle was stored for one week in a thermostatic bath "PLM-73S" (manufactured by Futaba K. K.) set at 200° C. After the elapse of one week, the test piece was taken out, the surface of the test piece was observed with a microscope, and the number of holes formed from which the metal was eluted was counted. Specifically, the number of holes formed in any 1 $mm^2$ of the test piece of 0 was evaluated and ranked as Good, the number of holes of 1 to 9 was evaluated as Fair, and the number of holes of 10 or more was evaluated as Poor.

(7) Tests Using Lithium Ion Secondary Battery

<<Fabrication of Positive Electrode Sheet>>

A slurry solution was prepared by mixing $LiNi_{1/3}Mn_{1/3}Co_{1/3}O_2$ (manufactured by Nippon Chemical Industrial Co., Ltd.) as the positive electrode active material, an acetylene black powder (manufactured by Denka Co., Ltd.) as the conductive assistant, and a polyvinylidene difluoride solution (manufactured by KUREHA CORPORATION) as the binder at a solid content ratio by weight of 90/6/4, adding N-methyl-2-pyrrolidone as a dispersion solvent to a solid content by weight of 40% followed by further mixing. Both sides of a 20 μm thick aluminum foil were coated with the slurry solution, the solvent was removed by drying, and thereafter, the coated aluminum foil was rolled with a roll press to obtain a positive electrode sheet.

<<Preparation of Negative Electrode Sheet>>

A slurry solution was prepared by mixing a graphite powder (Osaka Gas Chemicals Co., Ltd.) as the negative electrode active material, a styrene butadiene rubber and a carboxymethylcellulose aqueous solution as the binders at a solid content ratio by weight of 100/1.5/1.8, and adding water as a dispersion solvent to a solid content by weight of 45% followed by further mixing. Both sides of an 18 μm thick copper foil were coated with the slurry solution, the solvent was removed by drying, and thereafter, the coated copper foil was rolled with a roll press to obtain a negative electrode sheet.

<<Preparation of Nonaqueous Electrolytic Solution>>

$LiPF_6$ was contained at 1 mol/L in a mixed solvent in which ethylene carbonate and ethyl methyl carbonate as nonaqueous solvents were mixed at a volume ratio of 1:2 to prepare the solution.

<<Fabrication of Lithium Ion Secondary Battery>>

The positive electrode sheet and the negative electrode sheet as prepared in the manner described above were each combined on each side of the separator obtained in the Examples and Comparative Examples described below to form a laminate. The obtained laminate was inserted into a package (outer package) composed of an aluminum laminate film in which both surfaces of an aluminum foil (thickness of 40 μm) were covered with resin layers, with positive and negative electrode terminals being protruded from the package. Thereafter, the nonaqueous electrolytic solution as prepared in the manner described above was injected into the outer package, and the package was subjected to vacuum sealing to complete a Pouch type lithium ion secondary battery.

<<Initial Charge and Discharge of Lithium Ion Secondary Battery>>

The Pouch type lithium ion secondary battery was housed in a thermostatic chamber "PLM-73S" (manufactured by Futaba K.K.) set at 25° C. and connected to a charge/discharge apparatus "ACD-01" (manufactured by Aska Electronic Co., Ltd.). Next, the charge and discharge cycle wherein the secondary battery was charged with a constant current of 0.1 C until the voltage reached 4.2V, then charged with a constant voltage of 4.2V for 1 hour, and discharged down to 3.0V with a constant current of 0.1 C, was repeated three times. Thereafter it was charged with a constant current of 0.1 C until the voltage reached 4.2V to complete full charge of the lithium ion battery. In this regard, 1 C is defined as a current value with which a battery is discharged to full capacity in 1 hour and 0.1 C denotes 1/10 thereof.

<<20 C Discharge Tests of Lithium Ion Secondary Battery>>

The Pouch type lithium ion secondary battery after the initial charge/discharge was housed in a thermostatic chamber "PLM-73S" (manufactured by Futaba K. K.) set at 25° C. and connected with a charge/discharge apparatus "ACD-01" (manufactured by Aska Electronic Co., Ltd.). Next, the secondary battery was charged with a constant current of 1/3

C until the voltage reached 4.2V, thereafter charged with a constant voltage of 4.2V for one hour and discharged down to 3.0V with a constant current of 1 C. Subsequently, it was charged at a constant current of ⅓ C until the voltage reached 4.2V, charged with a constant voltage of 4.2V for an hour, and discharged down to 3.0V with a constant current of 20 C. From the results on the series of charge/discharge described above, the 20 C capacity retention ratio was calculated according to the equation below:

20 C capacity retention ratio (%)=20 C discharging capacity/1 C discharging capacity×100

<<Cycle Tests of Lithium Ion Secondary Battery>>

The Pouch type lithium ion secondary battery after the 20 C discharge test was housed in a thermostatic chamber "PLM-73S" (manufactured by Futaba K. K.) set at 50° C. and connected with a charge/discharge apparatus "ACD-01" (manufactured by Aska Electronic Co., Ltd.). Next, the secondary battery was charged with a constant current of 1 C until the voltage reached 4.2V, thereafter charged with a constant voltage of 4.2V for one hour and discharged down to 3.0V with a constant current of 1 C. The series of charge/discharge described above was defined as 1 cycle. Then, 100 cycles were carried out and the capacity retention ratio (%) after the 100 cycles was measured. Here, the capacity retention ratio (%) after 100 cycles was obtained according to the equation below:

Capacity retention ratio (%) after 100 cycles=discharging capacity at 100 cycles/discharging capacity at 1 cycle×100

(8) Surface hydrophilicity of Ionic Compound 0.5 g of the ionic compound was weighed in a glass tube, and vacuum degassing was carried out at 150° C. for 18 hours under a pressure of 0.001 mmHg or less. Next, using nitrogen or water vapor as the adsorbate in a multi-sample high performance specific surface area/pore distribution measurement apparatus "3 Flex" (manufactured by Micromeritics Instrument Corporation) according to JIS Z 8830: 2013, the specific surface area of the ionic compound was measured. The specific surface area ($S_{Water}$) obtained when water vapor was used as the adsorbate was divided with the specific surface area ($S_{Nitrogen}$) obtained when nitrogen was used as the adsorbate to calculate the surface hydrophilicity ($S_{Water}/S_{Nitrogen}$) of the ionic compound.

(9) Ratio of Weight Loss of Ionic Compound at 350° C. to That at 550° C.

The temperature of the ionic compound was raised at a rate of 10° C./minute from room temperature (23° C.) to 600° C. in a nitrogen atmosphere in a simultaneous measurement apparatus of thermogravimetry—differential thermal analysis "TG/DTA 6200" (manufactured by Hitachi High-Technologies Corporation), and the weight loss at 350° C. and that at 550° C. were each measured. Next, the weight loss ratio was calculated by dividing the weight loss at 350° C. with the weight loss at 550° C.

(10) 150° C. Heat Shrinkage Ratio (%)

The separator was cut into a square with a side of 100 mm, the sample was placed in a hot air dryer previously heated to 150° C., and the dimensional shrinkage (%) after 1 hour was determined. The sample was placed on a copy paper, etc., so as not to adhere to the inner wall of the dryer, etc., or not to fuse with each other.

Example 1

<<Surface Treatment of Ionic Compound>>

In 200 mL of water, 50 g of barium sulfate (average particle size of 50 nm) was charged, and the temperature was adjusted to 70° C. with stirring. A 2-isopropanol solution containing stearic acid equivalent to 8% by weight of barium sulfate was added little by little and stirred together at 70° C. for 30 minutes. Then, an aqueous solution containing barium hydroxide equivalent to ½ the weight of stearic acid was added dropwise and stirred together for 30 minutes. Thereafter, the solid was filtrated off and dried, and then grinded and pulverized to obtain a surface-treated barium sulfate powder. The measurement results of the degree of surface hydrophilicity and the weight loss ratio of the obtained powder are shown in Table 1.

<<Manufacture of Separator>>

High-density polyethylene (UH650, manufactured by Asahi Kasei Corporation) having a viscosity-average molecular weight of 700,000, the barium sulfate powder prepared as described above, liquid paraffin having a kinetic viscosity of 70.6 cSt at 40° C. as a plasticizer, and tetrakis-[methylene-(3',5'-di-t-butyl-4'-hydroxyphenyl) propionate] methane as an antioxidant were mixed at the proportion shown in Table 1 and kneaded using a laboplastmill (manufactured by Toyo Seiki Seisaku-sho, Ltd.) at 200° C.

An IR spectrum of the plasticizer which had bled out from the kneaded product was measured. The obtained IR spectrum is shown in FIG. 1 and the IR absorbance ratio is shown in Table 1. Moreover, the result on evaluation of the metal elution amount implemented using the kneaded product is shown in Table 1.

Next, the kneaded product was molded upon pressing at 150° C. under a pressure of 10 MPa and then cooled to 25° C. to fabricate a raw sheet having a thickness of 1 mm. The raw sheet was set in a simultaneous biaxial stretching machine, and subjected to simultaneous biaxial stretching with a stretching ratio of 7×7 in a temperature environment of 120° C. Then, the stretched raw sheet was taken out and immersed in methylene chloride followed by extraction of a plasticizer to obtain a separator. The evaluation results of the obtained separator are shown in Table 1.

Example 2

Figure 2:
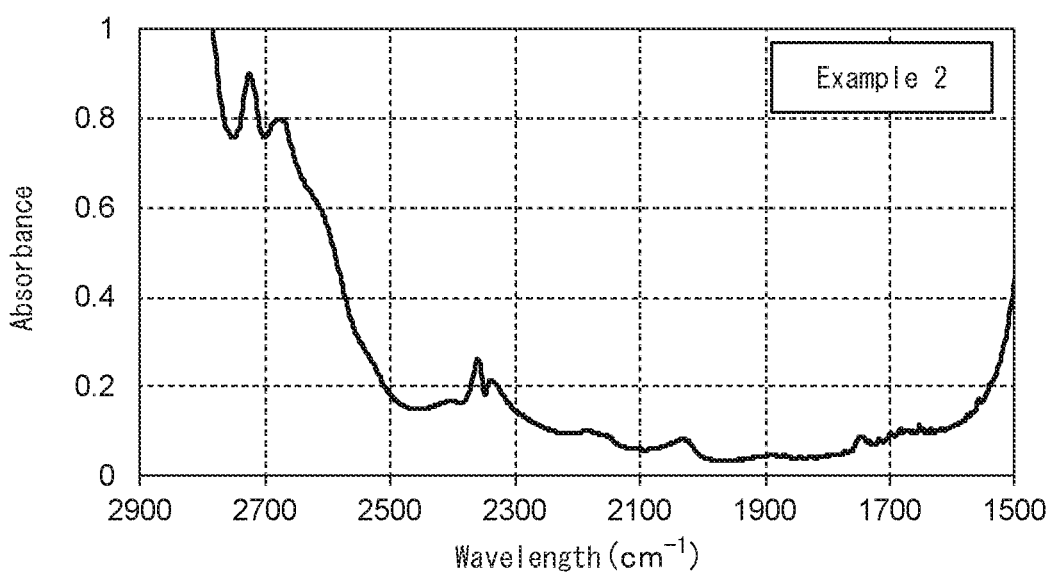
FIG. 2 is a graph illustrating an infrared (IR) spectrum of the plasticizer used in Example 2.

A separator was fabricated in the same manner as in Example 1 with the exception of using oleic acid in place of the stearic acid used in Example 1. The evaluation results of the obtained separator are shown in Table 1. The obtained IR spectrum is also shown in FIG. 2.

Example 3

Figure 3:
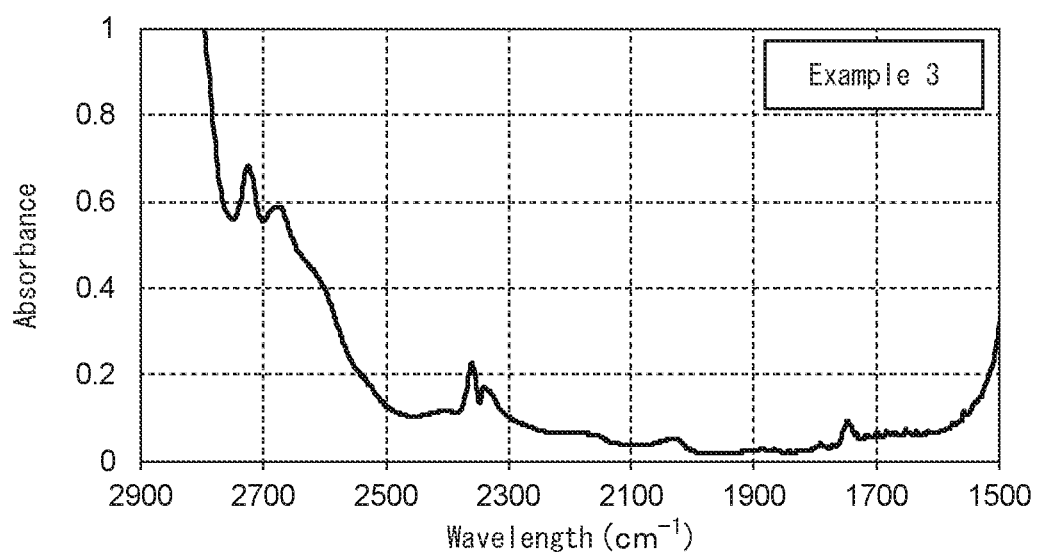
FIG. 3 is a graph illustrating an infrared (IR) spectrum of the plasticizer used in Example 3.

A separator was fabricated in the same manner as in Example 1 with the exception of using sodium phosphate (average particle size of 500 nm) in place of barium sulfate (average particle size of 50 nm) used in Example 1 and using stearic acid equivalent to 5% by weight of sodium phosphate. The evaluation results of the obtained separator are shown in Table 1. The obtained IR spectrum is also shown in FIG. 3.

Comparative Example 1

Figure 4:
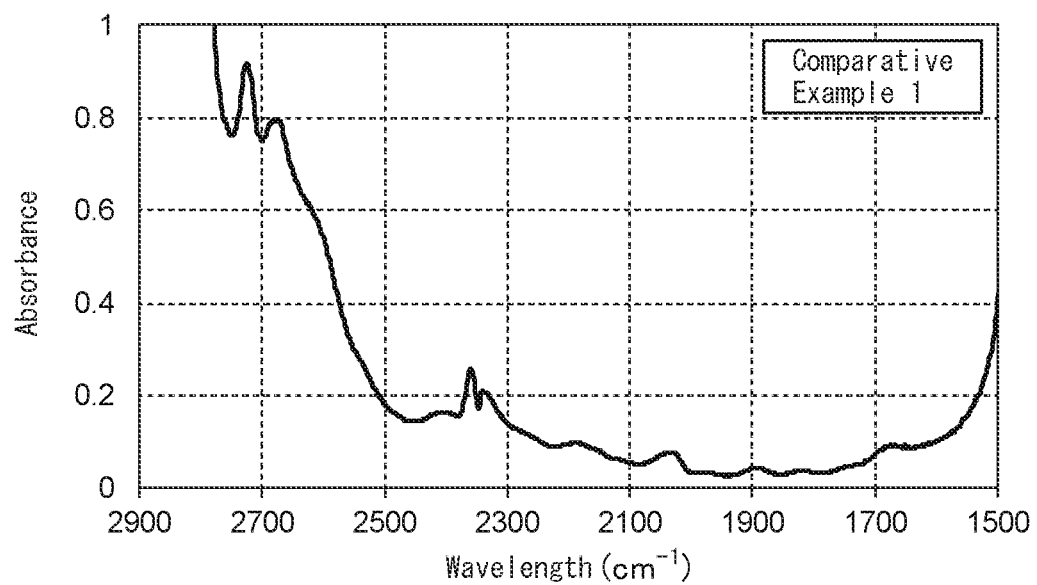
FIG. 4 is a graph illustrating an infrared (IR) spectrum of the plasticizer used in Comparative Example 1.

A separator was fabricated in the same manner as in Example 1 with the exception of using and mixing, in place of the mixed raw materials used in Example 1, raw materials such as high-density polyethylene (UH650, manufactured by Asahi Kasei Corporation) having a viscosity-average molecular weight of 700,000, liquid paraffin having a kinetic viscosity of 70.6 cSt at 40° C. as a plasticizer, and tetrakis-[methylene-(3',5'-di-t-butyl-4'-hydroxyphenyl)propionate] methane as an antioxidant at the proportion shown in Table 1. The evaluation results of the obtained separator are shown in Table 1. Since the ionic compound was not used in Comparative Example 1, the transmission IR spectrum of the plasticizer which had bled out for the kneaded product that did not contain the ionic compound, was measured and the IR absorbance ratio was shown in Table 1. The obtained IR spectrum is also shown in FIG. 4.

Comparative Example 2

Figure 5:
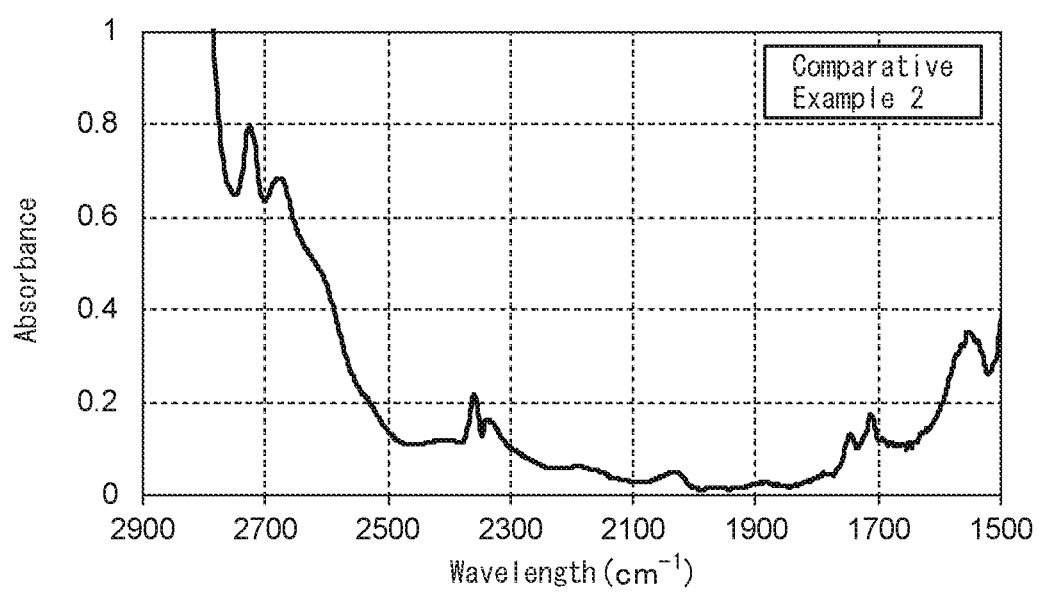
FIG. 5 is a graph illustrating an infrared (IR) spectrum of the plasticizer used in Comparative Example 2.

A separator was fabricated in the same manner as in Example 1 with the exception of carrying out the surface treatment of the ionic compound in Example 1 at room temperature (23° C.). The measurement results on the degree of surface hydrophilicity and weight loss ratio of the obtained powder are shown in Table 1. The evaluation results of the obtained separator are shown in Table 1. The obtained IR spectrum is also shown in FIG. 5.

added dropwise and stirred together for 60 minutes. Thereafter, the solid was filtrated off and dried, and then grinded and pulverized to obtain a surface-treated barium sulfate powder. The measurement results of the degree of surface hydrophilicity and the weight loss ratio of the obtained powder are shown in Table 2.

<<Manufacture of Separator>>

High-density polyethylene (UH650, manufactured by Asahi Kasei Corporation) having a viscosity-average molecular weight of 700,000, barium sulfate powder prepared as described above, liquid paraffin having a kinetic viscosity of 70.6 cSt at 40° C. as a plasticizer, and tetrakis-[methylene-(3',5'-di-t-butyl-4'-hydroxyphenyl)propionate] methane as an antioxidant were mixed at the proportion shown in Table 2 and kneaded using a laboplastmill (manufactured by Toyo Seiki Seisaku-sho, Ltd.) at 200° C.

An IR spectrum of the plasticizer which had bled out from the kneaded product was measured. The obtained IR absorbance ratio is shown in Table 2. Moreover, the result on the evaluation of the metal elution amount implemented using the kneaded product is shown in Table 2.

Next, the kneaded product was molded upon pressing at 150° C. under a pressure of 10 MPa and then cooled down

TABLE 1

|  |  |  | Example 1 | Example 2 | Example 3 | Comparative Example 1 | Comparative Example 2 |
|---|---|---|---|---|---|---|---|
| Raw materials of separator | Polyolefin resin | Type | HDPE | HDPE | HDPE | HDPE | HDPE |
|  |  | Use amount (part by weight) | 25 | 25 | 25 | 35 | 25 |
|  | Ionic compound | Type | $BaSO_4$ | $BaSO_4$ | $Na_3PO_4$ | — | $BaSO_4$ |
|  |  | Use amount (part by weight) | 10 | 10 | 10 | — | 10 |
|  |  | Type of surface treatment agent | Barium stearate | Barium olearate | Barium stearate | — | Barium stearate |
|  |  | Surface hydrophilicity | 0.38 | 0.44 | 0.47 | — | 0.84 |
|  |  | Ratio of weight loss at 350° C. to that at 550° C. | 0.11 | 0.14 | 0.21 | — | 0.71 |
|  | Plasticizer | Use amount (part by weight) | 65 | 65 | 65 | 65 | 65 |
|  | Antioxidant | Use amount (part by weight) | 0.2 | 0.2 | 0.2 | 0.3 | 0.2 |
| Separator characteristics |  | Thickness (μm) | 20 | 20 | 23 | 20 | 22 |
|  |  | Porosity (%) | 59 | 58 | 62 | 48 | 57 |
|  |  | Permeability (second/100 cc) | 90 | 90 | 85 | 220 | 100 |
|  |  | Puncture strength (gf) | 520 | 510 | 480 | 550 | 500 |
|  |  | IR absorbance ratio | 0.13 | 0.12 | 0.17 | 0.10 | 0.27 |
|  |  | Evaluation of metal elution amount | Good | Good | Fair | Good | Poor |
|  |  | 150° C. shrinkage (%) | 62 | 61 | 63 | 70 | 66 |
| Tests of lithium ion secondary battery |  | 20 C capacity retention ratio (%) | 22 | 22 | 23 | 9 | 20 |
|  |  | Capacity retention ratio after 100 cycles (%) | 80 | 81 | 80 | 74 | 78 |

Example 4

<<Surface Treatment of Ionic Compound>>

In 300 mL of water, 50 g of barium sulfate (average particle size of 50 nm) was charged, and the temperature was adjusted to 70° C. with stirring. A 2-isopropanol solution containing stearic acid equivalent to 4% by weight of barium sulfate was added little by little and stirred together at 70° C. for 30 minutes. Then, an aqueous solution containing barium hydroxide equivalent to ½ the weight of stearic acid was to 25° C. to fabricate a raw sheet having a thickness of 1 mm. The raw sheet was set in a simultaneous biaxial stretching machine, and subjected to simultaneous biaxial stretching with a stretching ratio of 7×7 in a temperature environment of 120° C. Then, the stretched raw sheet was taken out and immersed in methylene chloride followed by extraction of a plasticizer to obtain a separator. The evaluation results of the obtained separator are shown in Table 2.

Example 5

A separator was fabricated in the same manner as in Example 4 with the exception of using stearic acid equivalent to 2% by weight of barium sulfate in place of the stearic acid equivalent to 4% by weight of barium sulfate used in Example 4. The evaluation results of the obtained separator are shown in Table 2.

Example 6

A separator was fabricated in the same manner as in Example 4 with the exception of using sodium phosphate (average particle size of 500 nm) in place of barium sulfate (average particle size of 50 nm) used in Example 4 and using stearic acid equivalent to 2.5% by weight of sodium phosphate. The evaluation results of the obtained separator are shown in Table 2.

Example 7

A separator was fabricated in the same manner as in Example 6 with the exception of using stearic acid equivalent to 1.25% by weight of sodium phosphate in place of the stearic acid equivalent to 2.5% by weight of sodium phosphate used in Example 6. The evaluation results of the obtained separator are shown in Table 2.

Example 8

A separator was fabricated in the same manner as in Example 4 with the exception of using lauric acid in place of stearic acid used in Example 4. The evaluation results of the obtained separator are shown in Table 2.

Example 9

A separator was fabricated in the same manner as in Example 4 with the exception of using caprylic acid in place of stearic acid used in Example 4. The evaluation results of the obtained separator are shown in Table 2.

Example 10

A separator was fabricated in the same manner as in Example 4 with the exception of using myristoleic acid in place of stearic acid used in Example 4. The evaluation results of the obtained separator are shown in Table 2.

Comparative Example 3

In place of the surface-treated barium sulfate used for fabricating the separator in Example 4, barium sulfate without surface treatment was used as it was to fabricate a separator. The separator in which barium sulfate was significantly aggregated was inferior in quality thereof.

Comparative Example 4

A separator was fabricated in the same manner as in Example 4 with the exception of using barium sulfate subjected to surface treatment by the method described below in place of the surface-treated barium sulfate used for fabricating the separator in Example 4. The evaluation results of the obtained separator are shown in Table 2.

<<Surface Treatment of Ionic Compound>>

In 300 mL of water, 50 g of barium sulfate (average particle size of 50 nm) was charged, and the temperature was adjusted to 70° C. with stirring. An aqueous solution containing sodium stearate equivalent to 4.3% by weight of barium sulfate was added little by little and stirred together at 70° C. for 30 minutes. Then, hydrochloric acid containing hydrogen chloride equivalent to two times the weight of sodium stearate was added dropwise and stirred together for 60 minutes. Thereafter, the solid was filtrated off and dried, and then grinded and pulverized to obtain a surface-treated barium sulfate powder. The measurement results of the degree of surface hydrophilicity and the weight loss ratio of the obtained powder are shown in Table 2.

Comparative Example 5

A separator was fabricated in the same manner as in Example 4 with the exception of using stearic acid equivalent to 16% by weight of barium sulfate in place of stearic acid equivalent to 4% by weight of barium sulfate used in Example 4. The evaluation results of the obtained separator are shown in Table 2.

TABLE 2

| | | | Examp. 4 | Examp. 5 | Examp. 6 | Examp. 7 | Examp. 8 | Examp. 9 | Examp. 10 | Comp. Examp. 3 | Comp. Examp. 4 | Comp. Examp. 5 |
|---|---|---|---|---|---|---|---|---|---|---|---|---|
| Raw materials of separator | Polyolefin resin | Type | HDPE | HDPE | HDPE | HDPE | HDPE | HDPE | HDPE | HDPE | HDPE | HDPE |
| | | Use amount (part by weight) | 25 | 25 | 25 | 25 | 25 | 25 | 25 | 25 | 25 | 25 |
| | Ionic compound | Type | $BaSO_4$ | $BaSO_4$ | $Na_3PO_4$ | $Na_3PO_4$ | $BaSO_4$ | $BaSO_4$ | $BaSO_4$ | $BaSO_4$ | $BaSO_4$ | $BaSO_4$ |
| | | Use amount (part by weight) | 10 | 10 | 10 | 10 | 10 | 10 | 10 | 10 | 10 | 10 |
| | | Type of surface treatment agent | Barium stearate | Barium stearate | Barium stearate | Barium stearate | Barium laureate | Barium caprylate | Barium myristoleate | — | Stearic acid | Barium stearate |
| | | Surface hydrophilicity | 0.64 | 0.71 | 0.69 | 0.73 | 0.56 | 0.49 | 0.55 | — | 0.91 | 0.07 |
| | | Ratio of weight loss at 350° C. to that at 550° C. | 0.22 | 0.34 | 0.31 | 0.48 | 0.30 | 0.39 | 0.25 | — | 0.87 | 0.02 |
| | Plasticizer | Use amount (part by weight) | 65 | 65 | 65 | 65 | 65 | 65 | 65 | 65 | 65 | 65 |
| | Antioxidant | Use amount (part by weight) | 0.2 | 0.2 | 0.2 | 0.2 | 0.2 | 0.2 | 0.2 | 0.2 | 0.2 | 0.2 |
| Separator characteristics | | Thickness (μm) | 22 | 24 | 26 | 28 | 21 | 20 | 22 | — | 24 | 20 |
| | | Porosity (%) | 62 | 64 | 65 | 68 | 61 | 60 | 61 | — | 54 | 51 |
| | | Permeability (second/100 cc) | 60 | 45 | 75 | 65 | 70 | 65 | 75 | — | 120 | 190 |

TABLE 2-continued

|  |  | Examp. 4 | Examp. 5 | Examp. 6 | Examp. 7 | Examp. 8 | Examp. 9 | Examp. 10 | Comp. Examp. 3 | Comp. Examp. 4 | Comp. Examp. 5 |
|---|---|---|---|---|---|---|---|---|---|---|---|
| | Puncture strength (gf) | 500 | 490 | 470 | 450 | 490 | 480 | 490 | — | 420 | 430 |
| | IR absorbance ratio | 0.14 | 0.13 | 0.15 | 0.14 | 0.15 | 0.14 | 0.13 | — | 0.28 | 0.26 |
| | Evaluation of metal elution amount | Good | Good | Good | Good | Good | Good | Good | — | Poor | Fair |
| | 150° C. shrinkage (%) | 61 | 60 | 62 | 62 | 63 | 62 | 62 | — | 66 | 68 |
| Tests of lithium ion secondary battery | 20 C capacity retention ratio (%) | 27 | 30 | 24 | 26 | 24 | 25 | 24 | — | 17 | 12 |
| | Capacity retention ratio after 100 cycles (%) | 79 | 81 | 81 | 82 | 80 | 81 | 80 | — | 77 | 80 |

Example 11

<<Surface Treatment of Ionic Compound>>

A surface-treated barium sulfate powder was prepared in the same manner as in Example 4. The measurement results of the degree of surface hydrophilicity and the weight loss ratio of the obtained powder are shown in Table 3.

<<Manufacture of Separator>>

High-density polyethylene (UH850, manufactured by Asahi Kasei Corporation) having a viscosity-average molecular weight of 2,000,000, the barium sulfate powder prepared as described above, liquid paraffin having a kinetic viscosity of 70.6 cSt at 40° C. as a plasticizer, and tetrakis-[methylene-(3',5'-di-t-butyl-4'-hydroxyphenyl)propionate] methane as an antioxidant were mixed at the proportion shown in Table 3 and kneaded together using a laboplastmill (manufactured by Toyo Seiki Seisaku-sho, Ltd.) at 200° C.

An IR spectrum of the plasticizer which had bled out from the kneaded product was measured. The obtained IR absorbance ratio is shown in Table 3. Moreover, the result on the evaluation of the metal elution amount implemented using the kneaded product are shown in Table 3.

Next, the kneaded product was molded upon pressing at 180° C. under a pressure of 10 MPa and then cooled down to 25° C. to fabricate a raw sheet having a thickness of 1 mm. The raw sheet was set in a simultaneous biaxial stretching machine, and subjected to simultaneous biaxial stretching with a stretching ratio of 7×7 in a temperature environment of 105° C. Then, the stretched raw sheet was taken out and immersed in methylene chloride followed by extraction of a plasticizer to obtain a separator. The evaluation results of the obtained separator are shown in Table 3.

Example 12

A separator was fabricated in the same manner as in Example 11 with the exception of using the raw materials listed in Table 3 in place of the raw materials for the separator used in Example 11. The evaluation results of the obtained separator are shown in Table 3.

Example 13

A separator was fabricated in the same manner as in Example 11 with the exception of using the raw materials listed in Table 3 in place of the raw materials for the separator used in Example 11. The evaluation results of the obtained separator are shown in Table 3.

Example 14

A separator was produced in the same manner as in Example 11 with the exception of using the raw materials listed in Table 3 in place of the raw materials for the separator used in Example 11. The evaluation results of the obtained separator are shown in Table 3.

Example 15

A separator was fabricated in the same manner as in Example 11 with the exception of using the raw materials listed in Table 3 in place of the raw materials for the separator used in Example 11. The evaluation results of the obtained separator are shown in Table 3.

Example 16

A separator was fabricated in the same manner as in Example 11 with the exception of using the surface-treated sodium phosphate prepared in Example 6 in place of the surface-treated barium sulphate used in Example 11. The evaluation results of the obtained separator are shown in Table 3.

Example 17

A separator was fabricated in the same manner as in Example 13 with the exception of using the surface-treated sodium phosphate prepared in Example 6 in place of the surface-treated barium sulphate used in Example 13. The evaluation results of the obtained separator are shown in Table 3.

Comparative Example 6

In place of the surface-treated barium sulfate used for fabricating the separator in Example 14, barium sulfate without surface treatment was used as it was to try to fabricate a separator, however, the raw sheet obtained was ruptured in the stretching step, resulting in failure of separator fabrication.

Comparative Example 7

A separator was fabricated in the same manner as in Example 14 with the exception of using the surface-treated barium sulfate prepared in Comparative Example 4 in place of the surface-treated barium sulphate used for fabricating the separator in Example 14. The evaluation results of the obtained separator are shown in Table 3.

Comparative Example 8

A separator was fabricated in the same manner as in Example 14 with the exception of using the surface-treated barium sulfate prepared in Comparative Example 5 in place of the surface-treated barium sulphate used for fabricating the separator in Example 14. The evaluation results of the obtained separator are shown in Table 3.

TABLE 3

|  |  |  | Examp. 11 | Examp. 12 | Examp. 13 | Examp. 14 | Examp. 15 |
|---|---|---|---|---|---|---|---|
| Raw materials of separator | Polyolefin resin | Type | UHMWPE | UHMWPE | UHMWPE | UHMWPE | UHMWPE |
|  |  | Use amount (part by weight) | 14 | 9 | 7 | 3 | 2 |
|  | Ionic compound | Type | $BaSO_4$ | $BaSO_4$ | $BaSO_4$ | $BaSO_4$ | $BaSO_4$ |
|  |  | Use amount (part by weight) | 56 | 61 | 66 | 70 | 73 |
|  |  | Type of surface treatment agent | Barium stearate | Barium stearate | Barium stearate | Barium stearate | Barium stearate |
|  |  | Surface hydrophilicity | 0.64 | 0.64 | 0.64 | 0.64 | 0.64 |
|  |  | Ratio of weight loss at 350° C. to that at 550° C. | 0.22 | 0.22 | 0.22 | 0.22 | 0.22 |
|  | Plasticizer | Use amount (part by weight) | 30 | 30 | 27 | 27 | 25 |
|  | Antioxidant | Use amount (part by weight) | 0.014 | 0.009 | 0.007 | 0.003 | 0.002 |
| Separator characteristics |  | Thickness (μm) | 22 | 23 | 21 | 20 | 21 |
|  |  | Porosity (%) | 58 | 60 | 62 | 63 | 63 |
|  |  | Permeability (second/100 cc) | 105 | 100 | 95 | 80 | 75 |
|  |  | Puncture strength (gf) | 180 | 130 | 100 | 70 | 30 |
|  |  | IR absorbance ratio | 0.12 | 0.13 | 0.13 | 0.14 | 0.15 |
|  |  | Evaluation of metal elution amount | Good | Good | Good | Good | Good |
|  |  | 150° C. shrinkage (%) | 28 | 21 | 12 | 1 | 0 |
| Tests of lithium ion secondary battery |  | 20 C capacity retention ratio (%) | 20 | 21 | 22 | 23 | 24 |
|  |  | Capacity retention ratio after 100 cycles (%) | 80 | 81 | 81 | 82 | 80 |

|  |  |  | Examp. 16 | Examp. 17 | Comp. Examp. 6 | Comp. Examp. 7 | Comp. Examp. 8 |
|---|---|---|---|---|---|---|---|
| Raw materials of separator | Polyolefin resin | Type | UHMWPE | UHMWPE | UHMWPE | UHMWPE | UHMWPE |
|  |  | Use amount (part by weight) | 14 | 7 | 3 | 3 | 3 |
|  | Ionic compound | Type | $Na_3PO_4$ | $Na_3PO_4$ | $BaSO_4$ | $BaSO_4$ | $BaSO_4$ |
|  |  | Use amount (part by weight) | 56 | 66 | 70 | 70 | 70 |
|  |  | Type of surface treatment agent | Barium stearate | Barium stearate | — | Stearic acid | Barium stearate |
|  |  | Surface hydrophilicity | 0.69 | 0.69 | — | 0.91 | 0.07 |
|  |  | Ratio of weight loss at 350° C. to that at 550° C. | 0.31 | 0.31 | — | 0.87 | 0.02 |
|  | Plasticizer | Use amount (part by weight) | 30 | 27 | 27 | 27 | 27 |
|  | Antioxidant | Use amount (part by weight) | 0.014 | 0.007 | 0.003 | 0.003 | 0.003 |
| Separator characteristics |  | Thickness (μm) | 24 | 25 | — | 20 | 20 |
|  |  | Porosity (%) | 61 | 68 | — | 55 | 44 |
|  |  | Permeability (second/100 cc) | 80 | 70 | — | 120 | 290 |
|  |  | Puncture strength (gf) | 120 | 70 | — | 420 | 40 |
|  |  | IR absorbance ratio | 0.16 | 0.19 | — | 0.34 | 0.36 |
|  |  | Evaluation of metal elution amount | Fair | Fair | — | Poor | Poor |
|  |  | 150° C. shrinkage (%) | 20 | 8 | — | 32 | 52 |

TABLE 3-continued

| Tests of lithium ion secondary battery | 20 C capacity retention ratio (%) | 23 | 23 | — | 18 | 6 |
|---|---|---|---|---|---|---|
| | Capacity retention ratio after 100 cycles (%) | 82 | 83 | — | 78 | 76 |

From Tables 1 to 3, in Examples 1 to 17, the 20 C discharging capacities (discharging capacity with 20 C) and the capacity retention ratios after 100 cycles are higher, and the 150° C. thermal shrinkage (thermal shrinkage at 150° C.) values are smaller in contrast to those in Comparative Example 1 in which the ionic compound is not contained. Therefore, it is understood that the separator of the present embodiment not only improves the output characteristics and the durability of the electricity storage device but also contributes to the improvement of the safety.

Moreover, in Examples 1 to 17, the metal elution amounts are significantly smaller as compared with those in Comparative Examples 2, 4, 5, 7 and 8 in which the ionic compound is not subjected to surface treatment as appropriate. In Comparative Example 5 and Examples 3, 16 and 17 of the table, the evaluations of the metal elution amount are each rated as "Fair", but it was confirmed by the aforementioned experiments that Examples 3, 16 and 17 each exhibit smaller amount of metal elution than Comparative Example 5. Therefore, it is understood that the separator of the present embodiment does not contain metal impurities and is superior from the viewpoint of improving safety of the electricity storage device.

Next, Examples 1 to 17 exhibit not only to facilitate the manufacture of separators in contrast to Comparative Examples 3 and 6 in which the ionic compound is not subjected to the surface treatment, but also to suppress aggregation of the ionic compounds, which is superior in product quality.

From all those described above, it has been clarified that the separator for electricity storage devices which has the porous layer comprising the polyolefin resin and the ionic compound that has a content of 5% by weight or more and 99% by weight or less in the porous layer and is subjected to the specific surface treatment, functions sufficiently as a separator for electricity storage devices, thereby not only improving the output characteristics and durability of the electricity storage device, but also contributing to the improvement of safety.

The invention claimed is:

1. A separator for electricity storage devices, which has a porous layer comprising a polyolefin resin and a surface-treated ionic compound, wherein:
   the ionic compound has a content of 86% by weight or more and 99% by weight or less in the porous layer;
   the degree of surface hydrophilicity of the ionic compound is 0.10 or more and 0.80 or less;
   the ionic compound has one or more anions selected from the group consisting of a sulfate ion, a nitrate ion, a phosphate ion, and a halide ion; and
   the ionic compound has one or more cations selected from the group consisting of an alkali metal ion and an alkaline earth metal ion.

2. The separator according to claim 1, wherein a ratio of a weight loss of the surface-treated ionic compound at 350° C. to that at 550° C. is 0.03 or more and 0.70 or less.

3. The separator for electricity storage devices according to claim 1, wherein the ionic compound is surface-treated with one or more selected from the group consisting of saturated fatty acid, unsaturated fatty acid, a saturated fatty acid salt, and an unsaturated fatty acid salt.

4. The separator for electricity storage devices according to claim 1, wherein a surface treatment amount of the ionic compound is 0.1% by weight or more and 10% by weight or less based on 100% by weight of the surface-treated ionic compound.

5. The separator for electricity storage devices according to claim 1, wherein the ionic compound is barium sulfate.

6. The separator for electricity storage devices according to claim 1, wherein an average particle size of the ionic compound is 5 nm or more and 600 nm or less.

7. The separator for electricity storage devices according to claim 1, wherein the polyolefin resin contains polyethylene having a viscosity-average molecular weight of 600,000 or more.

8. The separator for electricity storage devices according to claim 1, wherein an average pore size is 10 nm or more and 150 nm or less.

9. The separator for electricity storage devices according to claim 1, wherein an air permeability is 10 seconds/100 ml or longer and 500 seconds/100 ml or shorter.

10. The separator for electricity storage devices according to claim 1, wherein a puncture strength is 100 gf or more and 600 gf or less.

11. An electricity storage device comprising a positive electrode, a negative electrode, and the separator for electricity storage devices according to claim 1.

12. A method for manufacturing an electricity storage device, which comprises the following steps:
   (1) a step of combining a positive electrode and a negative electrode via the separator for electricity storage devices according to claim 1, and inserting into an outer package; and
   (2) a step of injecting a nonaqueous electrolytic solution into the outer package and sealing the outer package.

13. A method for manufacturing a separator for electricity storage devices according to claim 1, comprising extracting a plasticizer from a kneaded product containing a plasticizer having an infrared (IR) absorbance ratio $A_{1700\ to\ 1800}/A_{2700}$ of 0.01 or more and 0.25 or less, a polyolefin resin, and an ionic compound, wherein:
   the ionic compound has one or more anions selected from the group consisting of a sulfate ion, a nitrate ion, a phosphate ion, and a halide ion; and
   the ionic compound has one or more cations selected from the group consisting of an alkali metal ion and an alkaline earth metal ion.

14. The method for manufacturing a separator for electricity storage devices according to claim 13, wherein a sheet molding of the kneaded product is stretched 4 times or more and 15 times or less in a machine direction (MD) and 4 times or more and 15 times or less in a transverse direction (TD).

15. The method for manufacturing a separator for electricity storage devices according to claim 13, which comprises a step of simultaneously stretching the sheet molding of the kneaded product to MD and TD.

16. An electricity storage device comprising a positive electrode, a negative electrode, and the separator for electricity storage devices manufactured according to claim 15.

17. A method for manufacturing an electricity storage device, which comprises the following steps:
(1) a step of combining a positive electrode and a negative electrode via the separator for electricity storage devices manufactured according to claim 15, and inserting to an outer package; and
(2) a step of injecting a nonaqueous electrolytic solution into the outer package and sealing the outer package.

* * * * *